United States Patent
Kono et al.

(10) Patent No.: US 8,547,713 B2
(45) Date of Patent: Oct. 1, 2013

(54) POWER CONVERSION SYSTEM

(75) Inventors: Masaki Kono, Tokyo (JP); Takahiko Kobayashi, Tokyo (JP); Keita Hatanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 723 days.

(21) Appl. No.: 12/596,992

(22) PCT Filed: Apr. 27, 2007

(86) PCT No.: PCT/JP2007/059182
§ 371 (c)(1),
(2), (4) Date: Oct. 22, 2009

(87) PCT Pub. No.: WO2008/139518
PCT Pub. Date: Nov. 20, 2008

(65) Prior Publication Data
US 2010/0118569 A1    May 13, 2010

(51) Int. Cl.
*H02M 5/40*        (2006.01)
(52) U.S. Cl.
USPC ................................ 363/34; 363/37; 318/716
(58) Field of Classification Search
USPC ..................... 363/34, 37; 318/798–809, 716; 701/19
See application file for complete search history.

(56) References Cited

U.S. PATENT DOCUMENTS

| | | | |
|---|---|---|---|
| 5,959,430 A * | 9/1999 | Yuki et al. ...................... | 318/805 |
| 6,437,997 B1 * | 8/2002 | Inarida et al. ................... | 363/37 |
| 6,822,417 B2 * | 11/2004 | Kawaji et al. ................. | 318/701 |
| 6,984,948 B2 * | 1/2006 | Nakata et al. ............ | 318/400.02 |
| 7,276,876 B2 * | 10/2007 | Kaneko et al. ................ | 318/716 |

FOREIGN PATENT DOCUMENTS

| | | |
|---|---|---|
| JP | 54-129318 | 10/1979 |
| JP | 58-43188 | 3/1983 |
| JP | 63-268465 | 11/1988 |
| JP | 64 077492 | 3/1989 |
| JP | 10 271900 | 10/1998 |
| JP | 2002-374681 | 12/2002 |
| JP | 2004-248430 | 9/2004 |
| JP | 2004 248450 | 9/2004 |
| WO | 99 23750 | 5/1999 |
| WO | WO 99/23750 | 5/1999 |

OTHER PUBLICATIONS

U.S. Appl. No. 12/444,648, filed Apr. 7, 2009, Kono.
U.S. Appl. No. 13/497,140, filed Mar. 20, 2012, Kono, et al.
Japanese Office Action issued Jul. 17, 2012, in Patent Application No. 2009-513864 (with English-language translation).
Japanese Office Action issued Dec. 11, 2012 in corresponding Japanese Application No. 2012-019884 (with an English Translation).

* cited by examiner

*Primary Examiner* — Adolf Berhane
*Assistant Examiner* — Yemane Mehari
(74) *Attorney, Agent, or Firm* — Oblon, Spivak, McClelland, Maier & Neustadt, L.L.P.

(57) ABSTRACT

A power conversion system includes a first power converter converting AC to DC, a second power converter converting DC to AC, a current detector detecting output current of the second power converter, a pulsation detector detecting a pulsating component associated with the AC to DC conversion of the first power converter from a pulsating component contained in at least any one of effective power, power, and apparent power of the second power converter, a voltage corrector outputting a correction amount correcting at least one of phase, frequency, and amplitude of a voltage output from the second power converter based on the pulsating component from the pulsation detector, and a voltage controller outputting a voltage instruction to be output from the second power converter based on the correction amount from the voltage corrector, wherein the second power converter converts DC to AC based on the voltage instruction from the voltage controller.

8 Claims, 20 Drawing Sheets

POWER CONVERSION SYSTEM

TECHNICAL FIELD

The present invention relates to a power conversion system for converting a DC voltage to a frequency-variable/voltage-variable AC voltage, and particularly to an AC-AC power conversion system having a converter and an inverter for receiving a DC output voltage of the converter and converting the DC output voltage to a frequency-variable/voltage-variable AC voltage.

BACKGROUND ART

In this type power conversion system, an input voltage of the inverter contains rectification ripple caused by rectification of the converter, and thus there occurs a beat phenomenon that excessive current flows through the inverter and the load thereof and causes commutation failure or damage of the inverter. Various proposals have been hitherto made to suppress the beat phenomenon of the inverter as described above.

According to one of the proposals, a pulsation detecting unit for detecting a pulsating component at the DC side of the inverter which is caused by the rectification of the converter is provided, and the phase and frequency of the output voltage of the inverter are adjusted in accordance with the thus-detected pulsation (see Patent Document 1).

In the power conversion system of the patent document 1, an inverter frequency correction amount is calculated on the basis of the pulsation rate of the detected DC input voltage, and the inverter frequency is adjusted in accordance with the pulsation of the DC input voltage, whereby current pulsation and torque pulsation can be reduced.

However, the method as described above is based on so-called feed-forward compensation of adjusting the inverter frequency in accordance with the pulsation of the DC input voltage, and this beat phenomenon occurs because an electric motor has a low impedance in frequency. Therefore, there is a case where torque pulsation may occur due to variation of a resistance value dependent on the individual difference of the electric motor or the temperature, and thus it is difficult to properly adjust the impedance. Furthermore, the pulsating component at the DC side is different in phase from the pulsating component at the AC side due to the efficiency or power factor of the power converter, and thus it is required to perform phase compensation by advancing the phase of the detected pulsating component or the like when the pulsating component at the DC side is used.

Furthermore, a power conversion system in which a state quantity corresponding to the torque of an electric motor is determined, the same frequency as the pulsation of the DC input voltage is integrated to generate a reference phase, and a sine-wave component and a cosine-wave component of the state quantity corresponding to the torque of the electric motor to the reference phase are calculated, thereby generating the output voltage phase angle compensation amount in accordance with the sine-wave component, the cosine-wave component and the reference phase is known in power conversion systems in which an output voltage phase angle is corrected on the basis of an output voltage phase angle compensation amount pulsating at the same frequency as pulsation of a DC input voltage input to an inverter, (see Patent Document 2).

However, the system of the patent document 2 detects phase current by a current detector and uses pulsation of Q-axis current, and thus it requires a component separation calculator containing a Sin-wave calculator, a Cos-wave calculator, a zero-cross detector, etc., plural integrators, a reference sine-wave calculator, etc. Therefore, a control system is very complicated. Accordingly, in order to implement this system, the capability of a microcomputer for processing software of the control system must be enhanced. In addition, with respect to the Sin-wave calculator, the Cos-wave calculator, the reference sine-wave calculator, etc., in order to implement sine wave accurately, it is required to shorten the operation time of the microcomputer, that is, high-speed processing is required. Therefore, it is required in the patent document 2 that the capacity of software increases and the microcomputer has high-speed performance, and thus there is a problem that the cost of the microcomputer for implementing the patent document 2 rises extremely.

Patent Document 1: JP-B-7-46918 (FIG. 1)
Patent Document 2: JP-A-2004-248450 (FIG. 1, FIG. 2, [0016] to [0018])

DISCLOSURE OF THE INVENTION

Problem to be Solved by the Invention

However, the original object of suppressing the beat phenomenon of an inverter is to suppress pulsation at the AC side of a power converter.

An object of the present invention is to provide a high-performance power conversion system that can suppress the beat phenomenon of an inverter by detecting pulsation of AC power of a power converter.

Furthermore, another object of the present invention is to provide a simple and low-cost power conversion system which does not require phase correction and also does not require any means of detecting a DC voltage pulsating component of a power converter.

Means of Solving the Problem

A power conversion system according to the present invention comprises: a first power converter for converting AC to DC; a second power converter for converting the DC converted by the first power converter to AC having any frequency; current detecting means for detecting output current of the second power converter; pulsation detecting means for detecting a pulsating component associated with the conversion from AC to DC in the first power converter from at least one pulsating component of an electric quantity at the AC side of the second power converter; voltage correcting means for outputting a correction amount to correct at least one of phase, frequency, amplitude and pulse position of a voltage to be output from the second power converter on the basis of the pulsating component obtained from the pulsation detecting means; and voltage control means for outputting a voltage instruction to be output to the second power converter on the basis of the correction amount obtained from the voltage correcting means, wherein the second power converter converts DC to AC on the basis of the voltage instruction obtained from the voltage control means.

EFFECT OF THE INVENTION

According to the present invention, by detecting the pulsation at the AC side which is originally required to be suppressed in AC power and AC voltage of the power converter, motor current pulsation and torque pulsation can be suppressed under a broad operation condition of the velocity and output of an electric motor, the dispersion of the constants of the electric motor, etc. Furthermore, since adjustment can be

3 more easily performed as compared with conventional techniques, the time required for the adjustment can be shortened, and a voltage detector is not required, so that the cost can be reduced and the control construction can be simplified.

4

Figure 20:
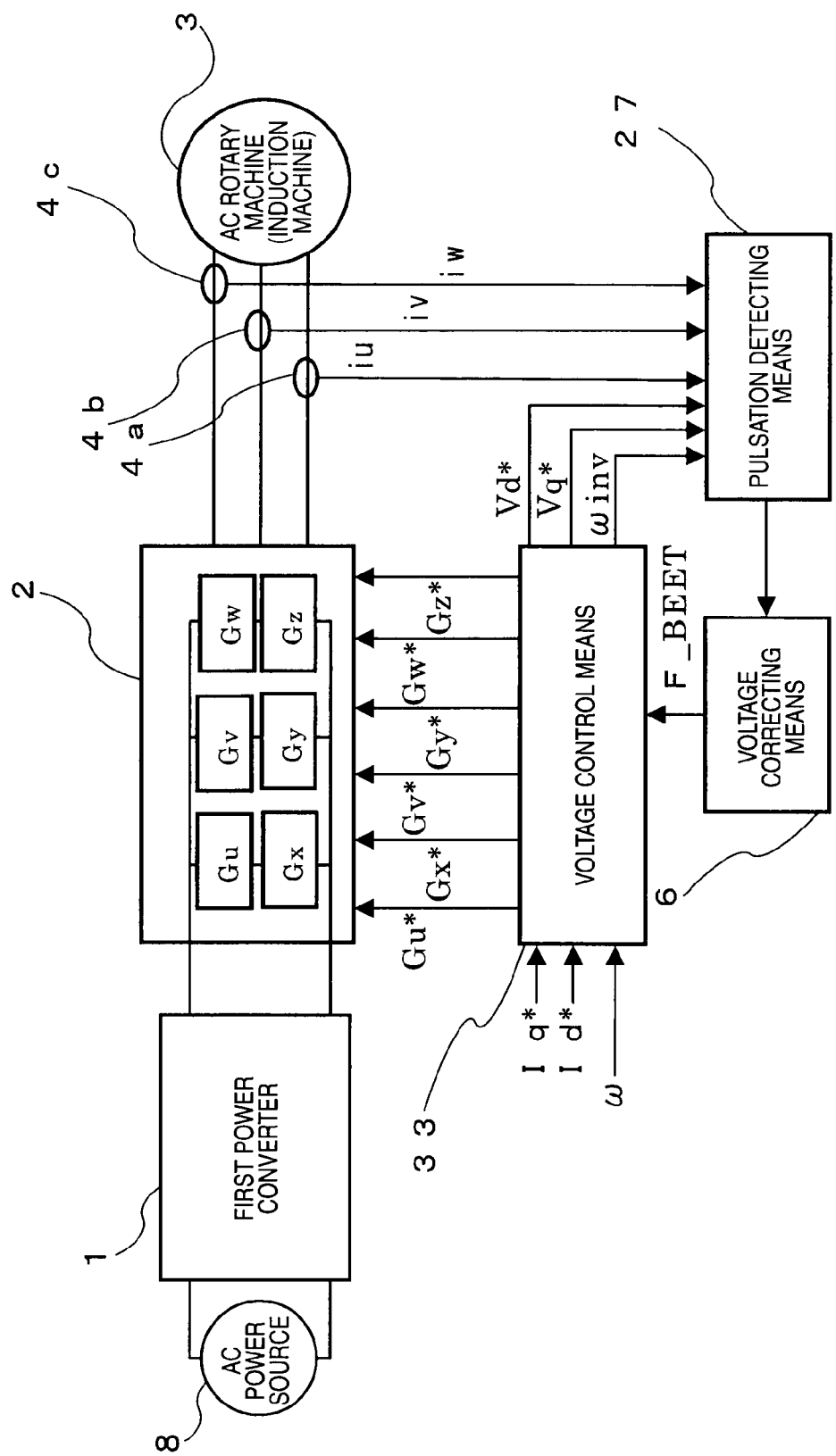

FIG. 20 is a diagram showing the construction of a power conversion system according to an eighth embodiment of the present invention.

BEST MODES FOR CARRYING OUT THE INVENTION

First Embodiment

An embodiment of a power conversion system according to the present invention will be described with reference to the accompanying drawings.

Figure 1:
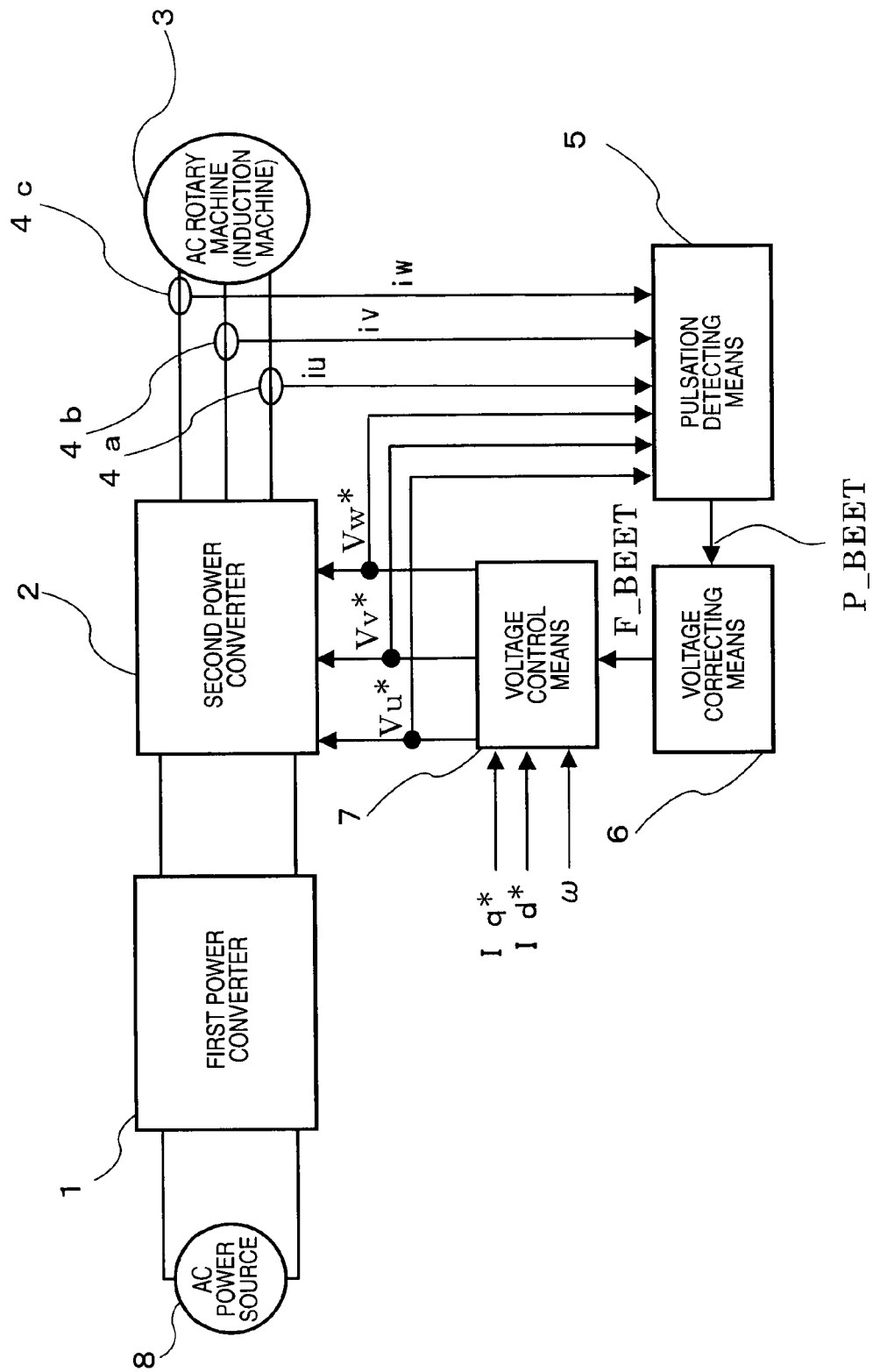
FIG. 1 is a diagram showing the construction of a power conversion system according to a first embodiment of the present invention.

FIG. 1 is a diagram showing a circuit construction of the power conversion system according to a first embodiment of the present invention. In FIG. 1, reference numeral 8 represents a single-phase AC power source, and 1 represents a first power converter for converting AC from the AC power source 8 to DC. Reference numeral 2 represents a second power converter for converting the DC converted by the first power converter 1 to AC having any frequency, and it is an inverter to which variable-voltage variable-frequency (VVVF) control or constant-voltage variable-frequency (CVVF) control is applied. Reference numeral 3 represents an induction machine as an AC rotary machine, and a three-phase voltage is applied from the second power converter 2 to the induction machine 3.

The first power converter 1 is well-known rectifying circuit means which uses a separately-excited rectifying circuit using a diode rectifying circuit or a bridge rectifying circuit or a self-excited rectifying circuit such as a PWM (Pulse Width Modulation)-controlled converter or the like from the AC power source 8.

Current detecting means 4a, 4b, 4c at the AC side detects phase current iu, iv, iw occurring in the induction machine 3. In FIG. 1, an example in which current flowing through a connection wire connecting the second power converter 2 and the induction machine 3 is detected by CT or the like is shown as the current detecting means 4 at the AC side. However, the phase current may be detected by another well-known method, for example, by using current flowing through the second power converter 2 such as bus current or the like. Since iu+iv+iw=0 is satisfied, the current detecting means 4c of the w-phase can be omitted by detecting the current of the w-phase from the detection current of two phases of u, v.

Reference numeral 5 represents pulsation detecting means, and for example, by calculating the effective power of the AC rotary machine, the pulsation detecting means detects a pulsating component which is associated with the conversion from AC to DC in the first power converter 1 and contained in the effective power. Reference numeral 6 represents voltage correcting means for outputting a correction amount to correct the frequency of a voltage to be output by the second power converter 2 on the basis of the pulsating component obtained from the pulsation detecting means 5. Reference numeral 7 represents voltage control means for outputting a voltage instruction to be output to the second power converter 2 on the basis of a torque current instruction Iq*, a magnetic flux current instruction Id*, an arbitrary angular frequency ω and a correction amount F_BEET obtained from the output voltage correcting means 6.

Figure 2:
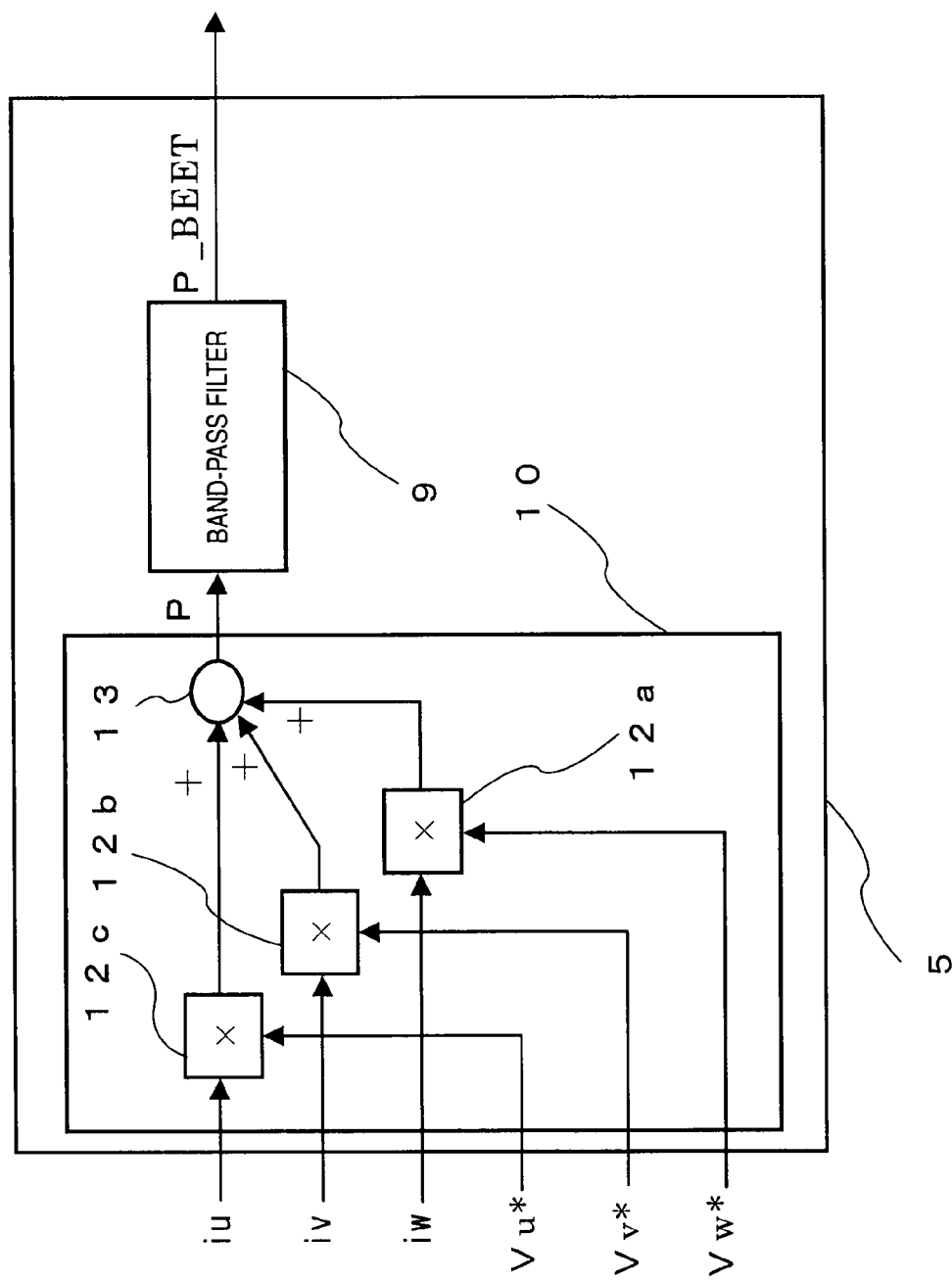
FIG. 2 is a diagram showing the detailed construction of pulsation detecting means according to the first embodiment of the present invention.

FIG. 2 shows the detailed construction of the pulsation detecting means 5 for detecting the pulsating component associated with the conversion of AC of the first power converter 1 to DC. In FIG. 2, the pulsation detecting means 5 roughly comprises effective power calculating means 10 and a band-pass filter 9. In the effective power calculating means 10, the phase current iu, iv, iw detected by the current detecting means 4 is multiplied by a voltage instruction Vu*, Vv*, Vw* (will be described in detail later) as an output of the voltage control means 7. That is, Vu* and iu are multiplied by each other in a multiplier 12c, Vv* and iv are multiplied by each other in a multiplier 12b and Vw* and iw are multiplied by each other in a multiplier 12a. These values are added to one another in an adder 13 to calculate an effective power P. That is, the following formula is executed in the effective power calculating means 10 in FIG. 2.

$$P = Vu^* \times iu + Vv^* \times iv + Vw^* \times iw \quad (1)$$

The effective power P as the output of the effective power calculating means 10 contains pulsation of motor current, a torque pulsating component caused by the pulsating component associated with the conversion from AC to DC in the first power converter 1.

Figure 4:
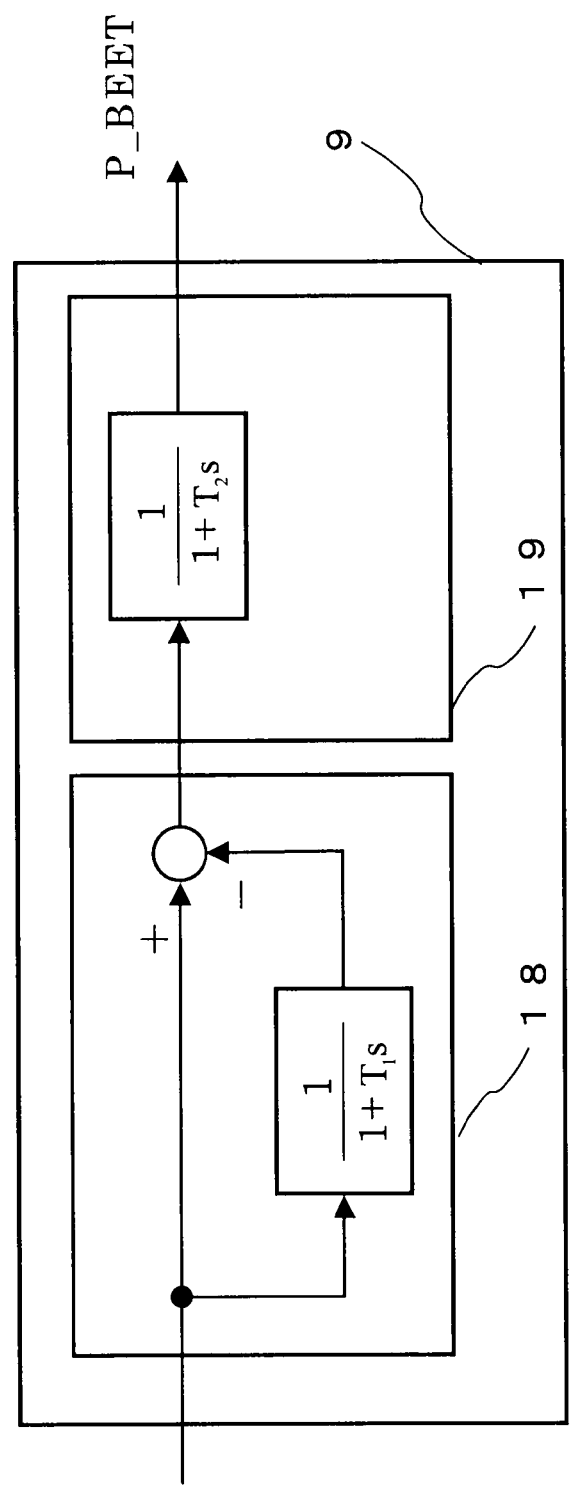
FIG. 4 is a diagram showing the construction of a band-pass filter according to the first embodiment of the present invention.

Furthermore, the band-pass filter 9 of FIG. 2 extracts only the pulsating component which is associated with the conversion from AC to DC in the first power converter 1 and contained in the effective power P, that is, the rectification ripple frequency. When the AC power source 8 is a single-phase AC power source, the frequency of the single-phase AC power source is equal to 60 Hz or 50 Hz in Japan. Therefore, the pulsating component associated with the conversion from AC to DC in the first power converter 1 is equal to the double of the frequency of the single-phase AC power source, that is, 120 Hz or 100 Hz. In this embodiment, the band-pass filter 9 is constructed by combining a high-pass filter (HPF) 18 and a low-pass filter (LPF) 19 as shown in FIG. 4 on the assumption that the frequency of the single-phase AC power source is equal to 60 Hz. The time constant $T_1$ of the high-pass filter 18 and the time constant $T_2$ of the low-pass filter 19 are set to 60 Hz and 180 Hz respectively because 120 Hz is set to the center. That is, the time constants $T_1$ and $T_2$ are set according to the following formulas (2)

$$\begin{matrix} T1 = 1/(2\pi \cdot 60) \\ T2 = 1/(2\pi \cdot 120) \end{matrix} \quad (2)$$

In this embodiment, the band-pass filter 9 comprises the combination of the high-pass filter (HPF) 18 and the low-pass filter (LPF) 19 as shown in FIG. 4. However, the same effect can be also obtained when it is represented by one function BPF using the Laplace operator s as indicated in the following formula (3) with the time constants of the formulas (2).

$$BPF = \frac{0.002653s}{0.000002345s^2 + 0.003537s + 1} \quad (3)$$

Figure 5:
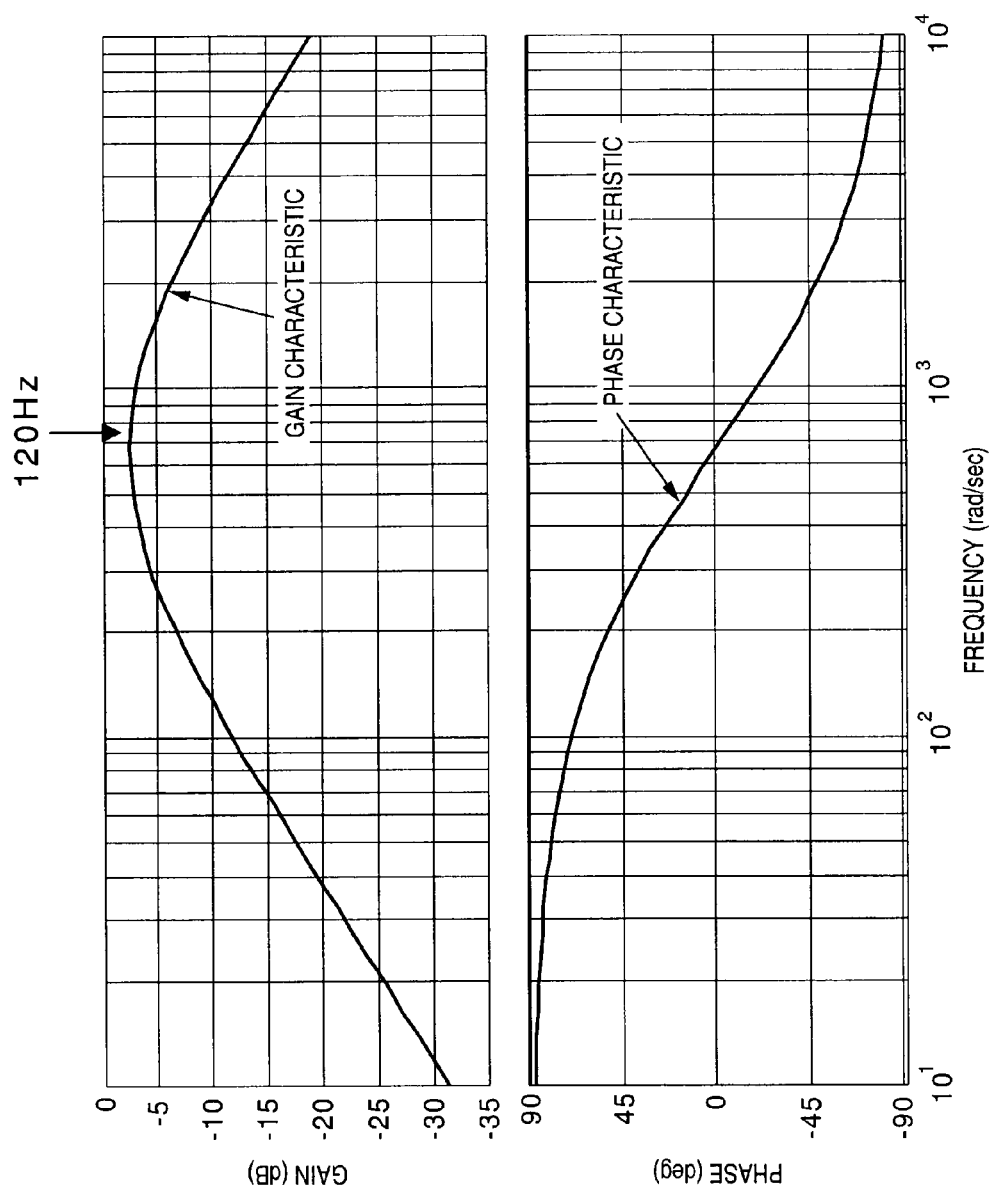
FIG. 5 is diagrams showing examples of a gain characteristic and a phase characteristic with respect to the frequency of the band-pass filter according to the first embodiment of the present invention.

FIG. 5 shows a gain characteristic and a phase characteristic with respect to the frequency When the band-pass filter 9 of FIG. 4 is constructed with the time constants of the formulas (2) (generally called as Bode diagram). From the characteristics of FIG. 5, it is apparent that the gain characteristic is a gain characteristic containing 120 Hz at the center thereof. Therefore, the band-pass filter 9 can extract a 120 Hz component as a pulsating component associated with the conversion from AC to DC in the first power converter 1, and output a pulsating component P_BEET.

Figure 3:
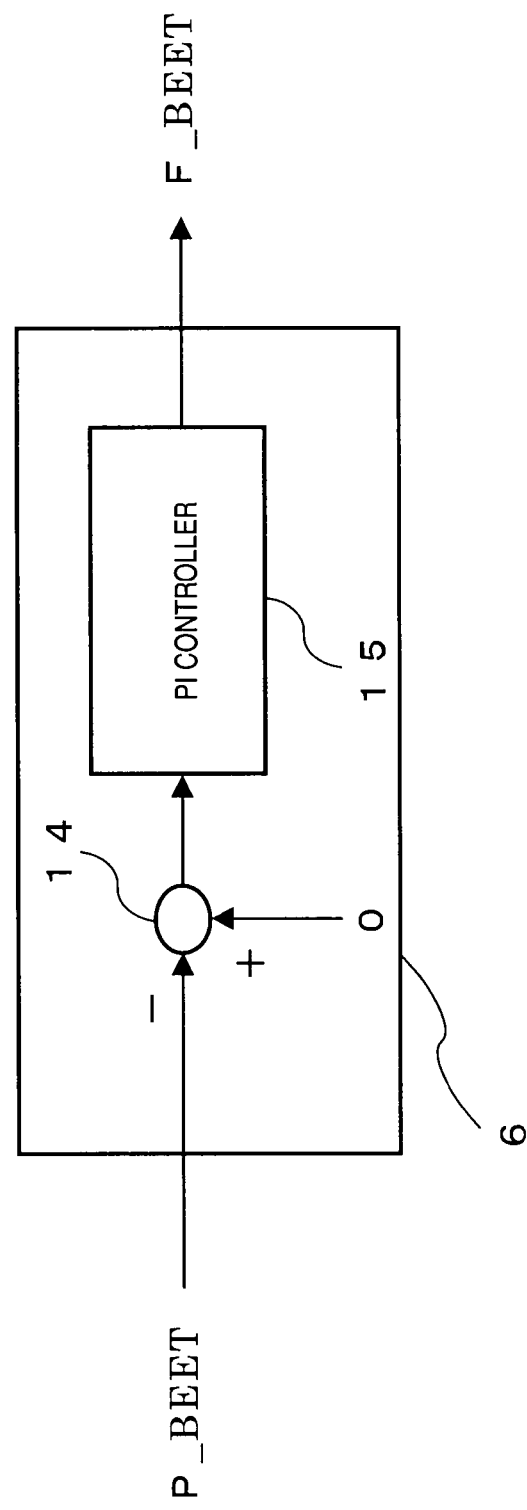
FIG. 3 is a diagram showing the detailed construction of voltage correcting means according to the first embodiment of the present invention.

Returning to FIG. 1, the voltage correcting means 6 calculates a correction amount for correcting the frequency of a voltage to be output from the second power converter 2 on the basis of the pulsating component P_BEET obtained from the pulsation detecting means 5 as described above. That is, the voltage correcting means 6 is constructed by a subtracter 14 and a PI (proportional integrator) controller 15 in order to make the pulsating component P_BEET obtained from the pulsation detecting means 5 equal to zero as an example of the internal construction of the voltage correcting means 6 as shown in FIG. 3. The subtracter 14 subtracts the pulsating component P_BEET from zero, and input the obtained value to the PI controller 15. Specifically, when the output of the PI controller 15 is represented by F_BEET, the voltage correcting means 6 can control so that the pulsating component P_BEET is equal to zero by executing the calculation represented by formula (4). Here, $k_b$ represents the proportional gain, and $\omega_b$ represents the integration gain.

$$F\_BEET = k_b\left(1 + \frac{\omega_b}{s}\right)(0 - P\_BEET) \quad (4)$$

Here, $k_b$ represents an important control response to determine a response of the PI controller. As described above, when the frequency of the single-phase AC power source is equal to 60 Hz, the pulsating component P_BEET is equal to 120 Hz. Accordingly, in order to suppress the pulsation of 120 Hz by the PI controller, it is required to set a response which is sufficiently higher than 120 Hz by about 10 times. In this embodiment, by setting the following response, the effect of this embodiment is obtained:

$$k_b = 2 \times \pi \times 120 \times 10 = 3770 \text{ [rad/sec]}$$

Subsequently, the voltage control means 7 calculates three-phase voltage instructions Vu*, Vv*, Vw* to be output to the second power converter 2 from a torque current instruction Iq, a magnetic flux current instruction Id and an arbitrary angular frequency ω on the basis of the correction amount F_BEET obtained from the voltage correcting means 6. Velocity information obtained by securing a velocity sensor to the induction machine 3 may be used for the arbitrary angular frequency ω. Alternatively, there is a velocity instruction ω* in such a system that velocity control is executed, and thus the velocity instruction ω* may be used as the arbitrary angular frequency ω. It is needless to say that a velocity estimation value calculated through the control using no velocity sensor is used as the arbitrary angular frequency ω.

In the voltage control means 7, a slip angular frequency instruction ωs* is calculated by using motor constants of the induction machine Rs: the primary resistance value of the motor, Ls: the primary inductance of the motor, $\sigma = 1 - M^2/Ls/Lr$, M: the mutual inductance of the motor, Lr: the secondary inductance of the motor and Rr: the secondary resistance value of the motor from the torque current instruction Iq*, the magnetic flux current instruction Id*. That is, the slip angular frequency instruction ωs* is calculated according to the formula (5).

$$\omega s^* = \frac{Iq^*}{Id^*} \times \frac{Rr}{Lr} \quad (5)$$

The slip angular frequency instruction ωs*, the arbitrary angular frequency ω and the correction amount F_BEET obtained from the voltage correcting means 6 are added to calculate an inverter angular frequency ωinv corresponding to the frequency of the voltage to be output by the second power converter 2. That is, the inverter angular frequency ωinv is calculated according to the formula (6).

$$\omega inv = \omega + \omega s^* + F\_BEET \quad (6)$$

That is, in the first embodiment, the frequency of the voltage to be output by the second power converter 2 is corrected on the basis of the pulsating component obtained from the pulsation detecting means 5. Furthermore, a d-axis voltage instruction Vd* and a q-axis voltage instruction Vq* on the rotational two axes can be calculated from the inverter angular frequency ωinv, the torque current instruction Iq* and the magnetic flux current instruction Id*. That is, the d-axis voltage instruction Vd* and the q-axis voltage instruction Vq* are calculated according to the formula (7).

$$Vd^* = Rs \times Id^* - \omega inv \times \tau \times Ls \times Iq^*$$

$$Vq^* = Rs \times Iq^* + \omega inv \times Ls \times Id^* \tag{7}$$

Furthermore, as well known, a control coordinate axis is required when a three-phase voltage or three-phase current is coordinate-transformed to rotational orthogonal two axes, and the phase of the control coordinate axis as the rotational two-axial coordinate is represented by θ on the basis of any inverter angular frequency ωinv. This phase θ is obtained according to the formula (8) by integrating the inverter angular frequency ωinv.

$$\theta = \int \omega inv \cdot dt \tag{8}$$

The three-phase voltage instructions Vu*, Vv*, Vw* are calculated by using the d-axis voltage instruction Vd*, the q-axis voltage instruction Vq* and the phase θ obtained according to the formulas (7) and (8). A voltage phase θv of the voltage instruction is slightly advancing ahead of the phase θ, and thus it is calculated according to the following formula (9).

$$\theta v = \theta + \tan^{-1}\left(\frac{Vq^*}{Vd^*}\right) \tag{9}$$

From the voltage phase θv obtained from the formula (9) and the d-axis voltage instruction Vd* and the q-axis voltage instruction Vq*, the three-phase voltage instructions Vu*, Vv* and Vw* are calculated according to the following formula (10).

$$\begin{pmatrix} Vu^* \\ Vv^* \\ Vw^* \end{pmatrix} = \sqrt{(Vd^*)^2 + (Vq^*)^2} \begin{pmatrix} \cos(\theta v) \\ \cos\left(\theta v - \frac{2}{3}\pi\right) \\ \cos\left(\theta v + \frac{2}{3}\pi\right) \end{pmatrix} \tag{10}$$

The second power converter 2 converts DC to AC on the basis of the three-phase voltage instructions Vu*, Vv*, Vw* which are obtained by the voltage control means 7 according to the above formula (10). According to the formula (10), the frequency of the voltage to be output by the second power converter 2 is corrected on the basis of the pulsating component obtained from the pulsation detecting means 5, and thus it is possible to suppress the motor current, torque pulsation at the output side of the second power converter 2.

Figure 6:
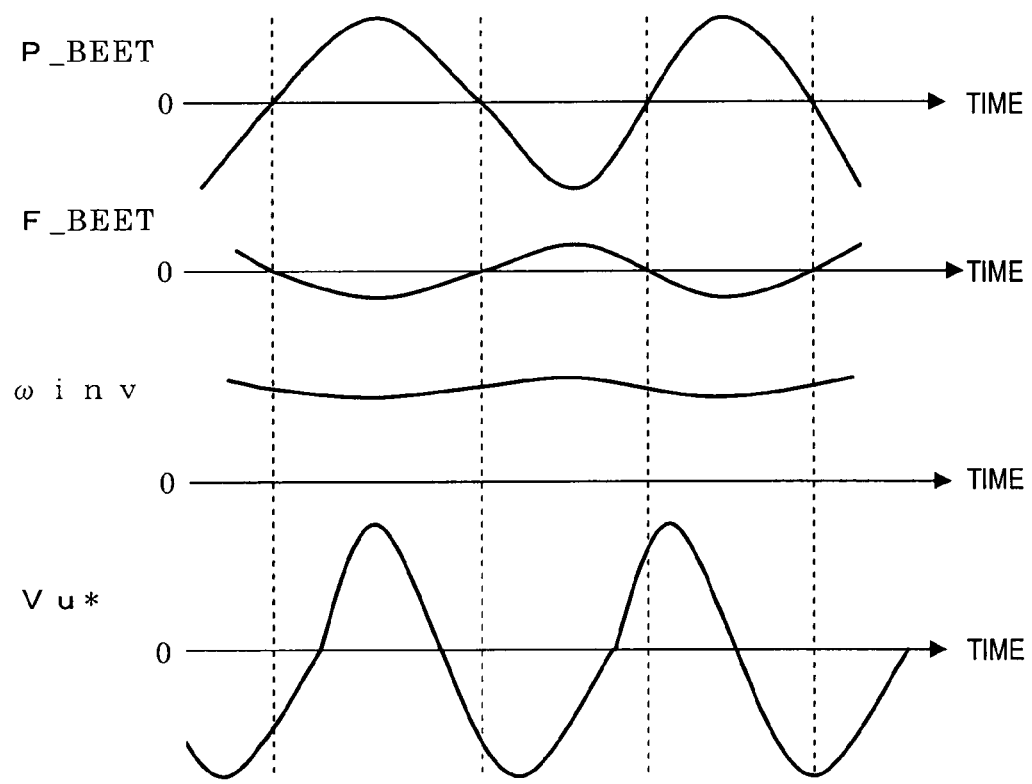
FIG. 6 is a waveform diagram of main constants to explain the operation of the power conversion system according to the first embodiment of the present invention.

FIG. 6 shows the operation states of main control constants. As shown in FIG. 6, if the pulsating component P_BEET obtained from the pulsation detecting means 5 which is synchronized with the pulsation of the motor current, torque pulsation at the output side of the second power converter 2 is positive, the correction amount F_BEET as the output of the voltage correcting means 6 operates in the negative direction, and adjusts the inverter angular frequency ωinv so that the inverter angular frequency decreases, so that the frequencies of the three-phase voltage instructions Vu*, Vv*, Vw* output by the voltage control means 7 are lowered. Conversely, if the pulsating component P_BEET obtained from the pulsation detecting means 5 is negative, the correction amount F_BEET as the output of the voltage correcting means 6 operates in the positive direction, and the inverter angular frequency ωinv is adjusted to increase, so that the frequencies of the three-phase voltage instructions Vu*, Vv*, Vw* output by the voltage control means 7 increase. As described above, the control as described above is executed in accordance with the motor current, torque pulsation at the output side of the second power converter 2, whereby the pulsation of the motor current, torque pulsation at the output side of the second power converter 2 can be suppressed.

Figure 7:
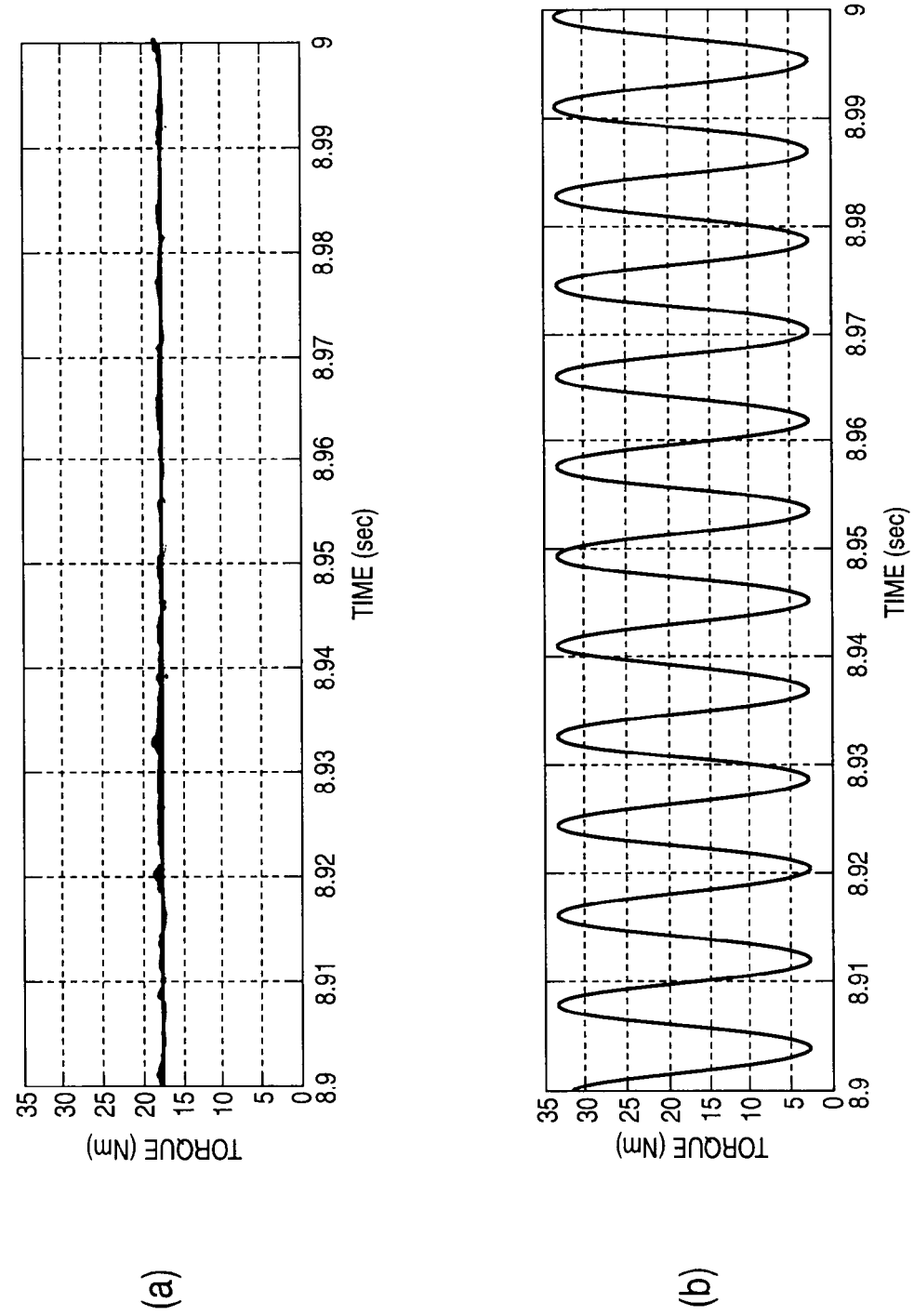
FIG. 7 is a diagram showing a torque waveform of a simulation for checking an effect of the first embodiment of the present invention.

Next, in order to confirm the validity of the first embodiment described above, a simulation was executed by using the induction machine 3 having a capacity of 5 kW (rating: voltage 400V, current 10 A). FIG. 7 shows a torque waveform based on the simulation when the inverter frequency is set to 97 Hz. FIG. 7(a) shows a torque waveform when the first embodiment is executed, and FIG. 7(b) shows a torque waveform when the first embodiment is not executed. It can be confirmed from FIG. 7(b) that the torque wave pulsates at 120 Hz which corresponds to the double of the single-phase power supply frequency. On the other hand, from FIG. 7(a) in which the first embodiment was implemented, it is found that the torque waveform has little pulsation of 120 Hz. By implementing this embodiment, it can be confirmed that most of the torque pulsation can be reduced.

This embodiment can be implemented on both the variable-voltage variable-frequency (VVVF) control and the constant-voltage variable-frequency (CVVF) control.

As described above, by implementing the first embodiment, with respect to the effect of the pulsation associated with the conversion from AC to DC in the first power converter 1, there can be obtained an effect that the torque pulsation and the motor current pulsation, etc. can be suppressed by detecting the pulsating component contained in the effective power of the second power converter 2 and correcting the frequency of the voltage output by the second power converter 2.

Second Embodiment

Figure 8:
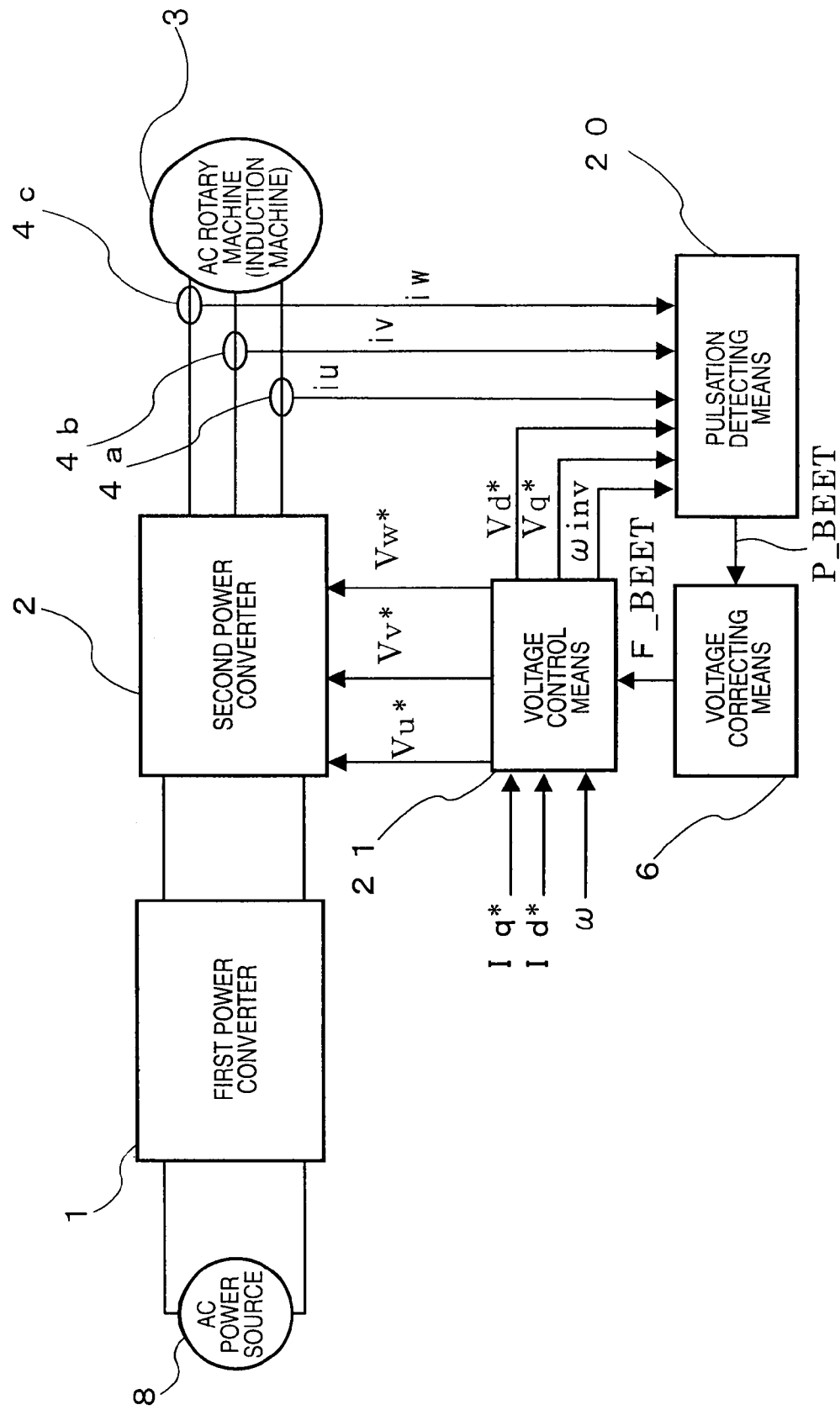
FIG. 8 is a diagram showing the construction of a power conversion system according to a second embodiment of the present invention.

Next, a power conversion system according to a second embodiment will be described with reference to FIG. 8. This embodiment is different from the first embodiment in pulsation detecting means 20 and voltage control means 21. In the first embodiment, the effective power is calculated from the three-phase voltage instructions Vu*, Vv*, Vw* and the three-phase current iu, iv, iw, the pulsating component is detected from the effective power, and the frequency is corrected on the basis of the pulsating component. However, in this embodiment, the effective power is calculated from the dq-axis voltage instructions Vd*, Vq* and the dq-axis current Id, Iq, and the amplitude of the voltage instruction is corrected in accordance with the pulsating component of the effective power. The other constructions are the same as the first embodiment and represented by the same reference numerals, and only the different portion will be described hereunder.

Figure 9:
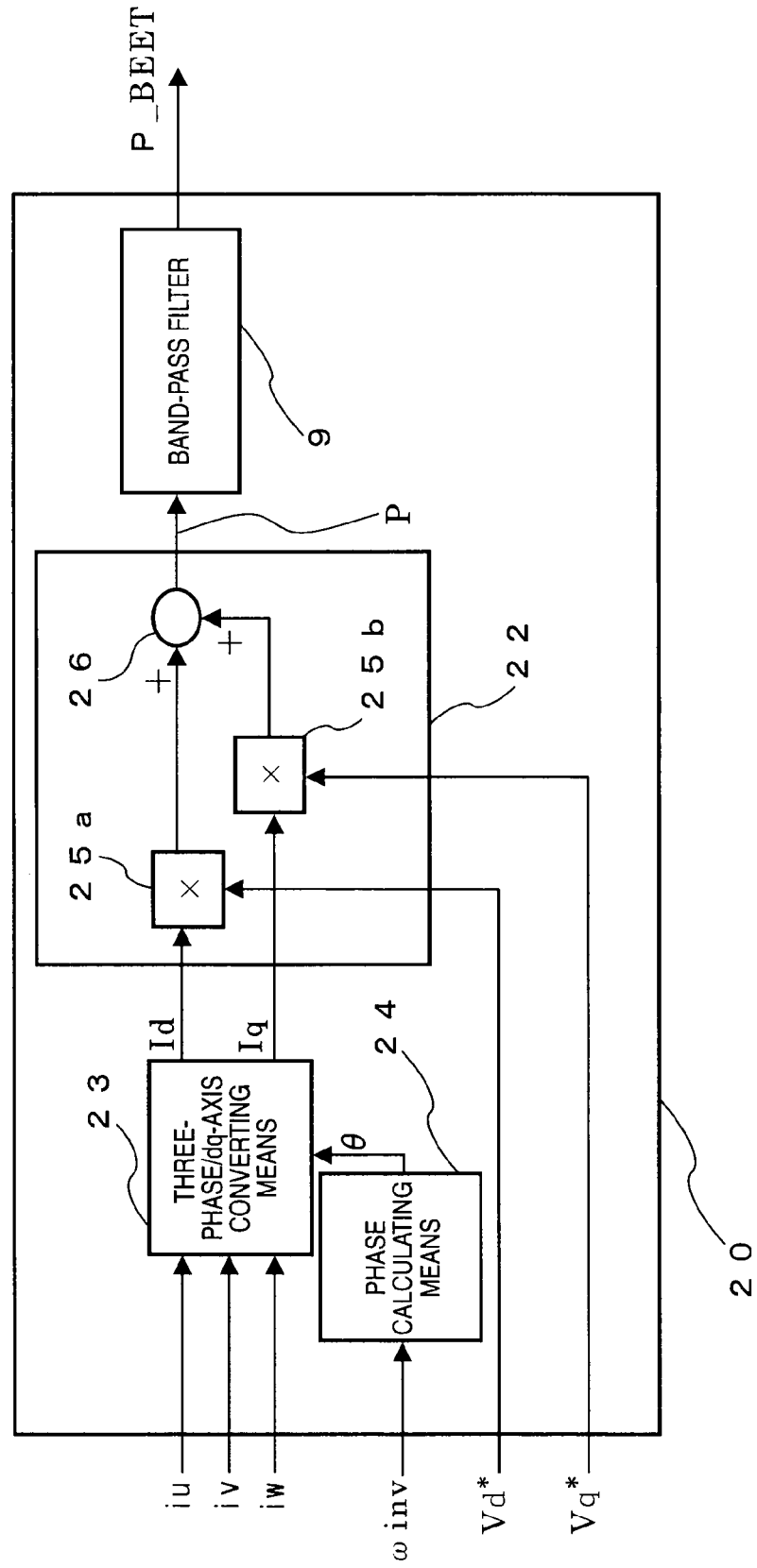
FIG. 9 is a diagram showing the detailed construction of pulsation detecting means according to the second embodiment of the present invention.

FIG. 9 is a diagram showing the detailed construction of the pulsation detecting means 20 according to this embodiment, and it comprises a three-phase/dq-axis converting operation means 23 for calculating phase current iu, iv, iw detected by the current detecting means 4 to dq-axis current Id, Iq, effective power calculating means 22 and the band-pass filter 9 which is the same as described above with respect to the first embodiment. As well known, a control coordinate axis is required when three-phase current is coordinate-transformed to rotational orthogonal two axes. The phase of the control coordinate axis as the rotational two-axes coordinate is set to 0 on the basis of any inverter angular frequency ωinv. Any inverter angular frequency ωinv is input to calculate the phase θ by phase calculating means 24, and it is input to three-phase/dq-axis converting operation means 23. The phase calculating means 24 calculates according to the formula (8).

The effective power calculating means 22 multiplies Vd* by id in a multiplier 25a of FIG. 9, multiplies Vq* by iq in a multiplier 25b and adds the respective multiplication results in an adder 26 by using the dq-axis current Id, Iq calculated in the three-phase/dq-axis converting operation means 23 and the dq-axis voltage instructions Vd*, Vq* calculated in the voltage control means 21, thereby calculating the effective power P. That is, the following formula is executed in the effective power calculating means 22 of FIG. 9.

$$P = Vd^* \times id + Vq^* \times iq \tag{11}$$

The effective power P output from the effective power calculating means 22 contains the pulsation of the motor current, the torque pulsating component which is caused by the pulsating component associated with the conversion from AC to DC of the first power converter 1. The effective power P calculated by the effective power calculating means 22 is input to the band-pass filter 9 which is the same as the first embodiment, and the output P_BEET of the band-pass filter 9 is input to the voltage correcting means 6. The output F_BEET of the voltage correcting means 6 is input to the voltage control means 21.

The voltage control means 21 outputs the three-phase voltage instructions Vu*, Vv*, Vw* to be output to the second power converter 2 from the torque current instruction Iq*, the magnetic flux current instruction Id* and any angular frequency w on the basis of the correction amount F_BEET obtained from the voltage correcting means 6.

The voltage control means 21 calculates the slip angular frequency instruction ωs* by using the motor constants of the induction machine Rs: primary resistance value of the motor, Ls: the primary inductance of the motor, σ=1−M²/Ls/Lr, M: the mutual inductance of the motor, Lr: the secondary inductance of the motor and Rr: the secondary resistance value of the motor from the torque current instruction Iq*, the magnetic flux current instruction Id*. That is, the slip angle frequency instruction ωs* is calculated according to the formula (5) as in the case of the first embodiment. By adding the slip angular frequency instruction ωs*, an arbitrary angular frequency ω and the correction amount F_BEET obtained from the voltage correcting means 6, the second power conversion system 2 calculates the inverter angular frequency ωinv corresponding to the frequency of the voltage instruction to be output. That is, the inverter angular frequency ωinv is calculated according to the following formula (12).

$$\omega inv = \omega + \omega s^* \tag{12}$$

The d-axis voltage instruction Vd* and the q-axis voltage instruction Vq* on the rotational two axes can be calculated from the inverter angular frequency ωinv, the torque current instruction Iq* and the magnetic flux current instruction Id*. That is, the d-axis voltage instruction Vd* and the q-axis voltage instruction Vq* are calculated according to the formula (7) as in the case of the first embodiment. Furthermore, as well known, the control coordinate axis is required when the three-phase voltage or the three-phase current is coordinate-transformed to the rotational orthogonal two axes. The phase of the control coordinate axis as the rotational two-axes coordinate is set to 0 on the basis of an arbitrary inverter angular frequency ωinv. This phase θ is obtained from the formula (8) as in the case of the first embodiment by integrating the inverter angular frequency ωinv.

The three-phase voltage instructions Vu*, Vv*, Vw* are calculated by using the d-axis voltage instruction Vd*, the q-axis voltage instruction Vq* and the phase θ obtained from the formulas (7) and (8). The voltage phase θv of the voltage instruction advances slightly ahead of the phase θ, and thus it is calculated from the formula (9) as in the case of the first embodiment. The three-phase voltage instructions Vu*, Vv*, Vw* are calculated from formula (13) on the basis of the voltage phase θv obtained from the formula (9), the d-axis voltage instruction Vd* and the q-axis voltage instruction Vq*. The formula (13) is characterized in that the correction amount F_BEET output from the voltage correcting means 6 is added to $\sqrt{(Vd^*)^2 + (Vq^*)^2 + (F\_BEET)^2}$ corresponding to the amplitude of the three-phase voltage instructions Vu*, Vv*, Vw*.

$$\begin{pmatrix} Vu^* \\ Vv^* \\ Vw^* \end{pmatrix} = \sqrt{(Vd^*)^2 + (Vq^*)^2 + (F\_BEET)^2} \begin{pmatrix} \cos(\theta v) \\ \cos\left(\theta v - \frac{2}{3}\pi\right) \\ \cos\left(\theta v + \frac{2}{3}\pi\right) \end{pmatrix} \tag{13}$$

When the pulsating component P_BEET obtained from the pulsation detecting means 20 which is synchronized with the motor current, torque pulsation at the output side of the second power converter 2 is positive, the correction amount F_BEET output from the voltage correcting means 6 operates in the negative direction, the amplitude of the three-phase voltage instructions Vu*, Vv*, Vw* is adjusted to decrease, and the amplitude of the three-phase voltage instructions Vu*, Vv*, Vw* output from the voltage control means 21 is reduced. Conversely, when the pulsating component P_BEET obtained from the pulsation detecting means 20 is negative, the correction amount F_BEET output from the voltage correcting means 6 operates in the positive direction, and the amplitude of the three-phase voltage instructions Vu*, Vv*, Vw* is adjusted to increase, so that the amplitude of the three-phase voltage instructions Vu*, Vv*, Vw* output from the voltage control means 21 increases. Accordingly, the control can be performed in accordance with motor current, torque pulsation at the output side of the second power converter 2, and the motor current, torque pulsation at the output side of the second power converter 2 can be suppressed.

In this embodiment, the amplitude of the voltage instruction is corrected, and thus this embodiment can be executed on the basis of only the variable-voltage variable-frequency (VVVF) control.

As described above, by executing the second embodiment, with respect to the effect of the pulsation associated with the conversion from AC to DC in the first power converter 1, there can be obtained the effect that the torque pulsation, etc. can be suppressed by detecting the pulsating component contained in the effective power of the second power converter 2 and correcting the amplitude of the voltage output from the second power converter 2.

Third Embodiment

Figure 10:
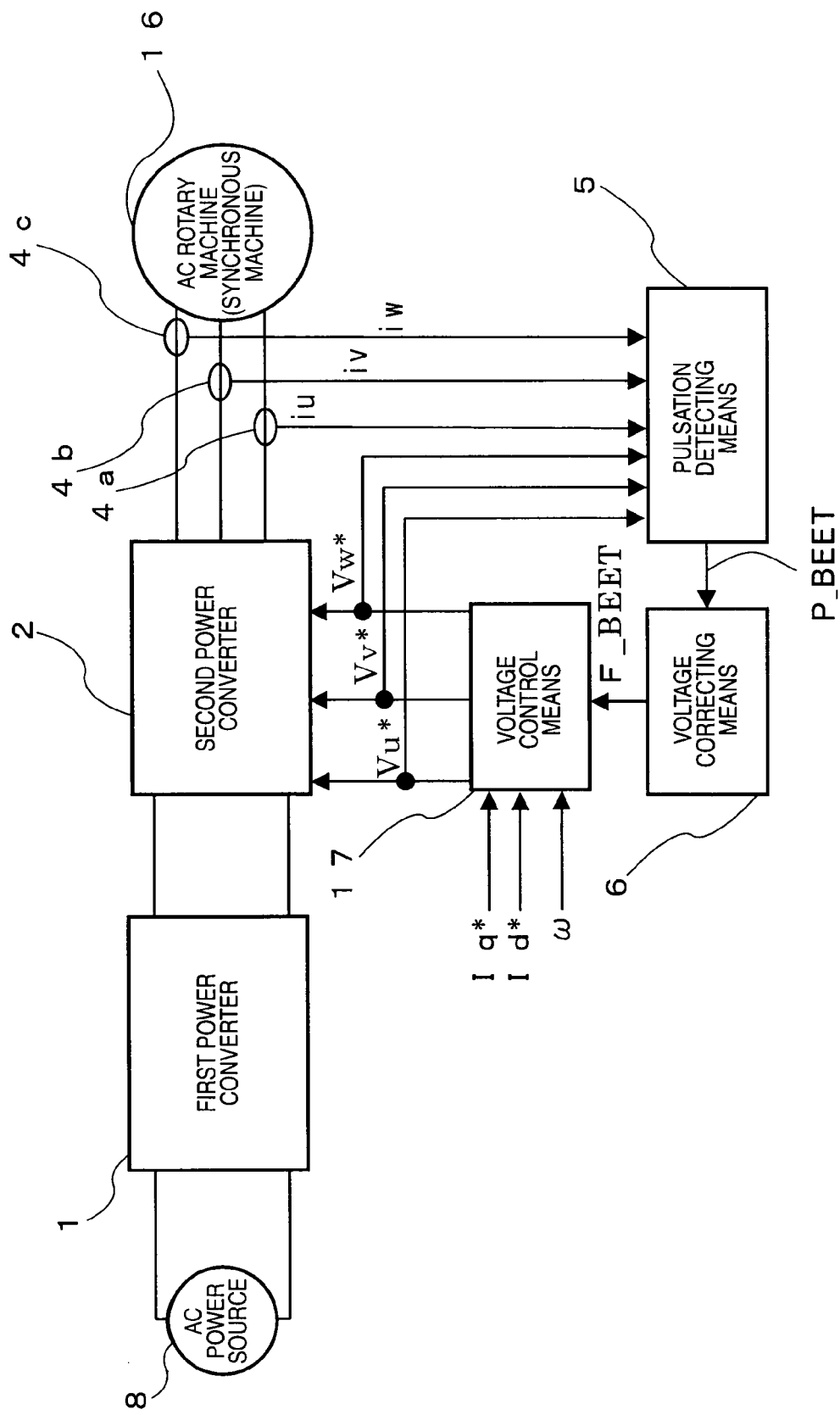
FIG. 10 is a diagram showing the construction of a power conversion system according to a third embodiment of the present invention.

Next, a power conversion system according to a third embodiment will be described with reference to FIG. 10. In this embodiment, it is assumed that this embodiment is applied to a synchronous machine 16 although the AC rotary machine of the first embodiment is the induction machine. The process until the correction amount F_BEET as an output of the voltage correcting means 6 is obtained is the same as the first embodiment, and the same reference numerals are allocated in the figures. This embodiment is different from the first embodiment in only the voltage control means 17. In the first embodiment, the pulsating component contained in the effective power of the second power converter 2 is detected, and the frequency of the voltage output from the second power converter 2 is corrected. However, in this embodiment 3, the pulsating component is detected from the effective power, and the phase of the voltage instruction is corrected in accordance with the pulsating component of the effective power.

The voltage control means 17 can calculate the d-axis voltage instruction Vd* and the q-axis voltage instruction Vq* on the rotational two axes from the arbitrary angular frequency w, the torque current instruction Iq*, the magnetic flux current instruction Id*, d, q-axis inductance Ld, Lq, the interlinkage magnetic flux Φ by a permanent magnet and the differential operator p=d/dt. That is, the d-axis voltage instruction Vd* and the q-axis voltage instruction Vq* are calculated according to the formula (14).

$$Vd^* = \left(R + \frac{d}{dt}Ld\right) \times id^* - \omega \times Lq \times Iq^* \qquad (14)$$

$$Vq^* = \omega \times Ld \times Id^* + \left(R + \frac{d}{dt}Lq\right) \times Iq^* + \omega\phi$$

Furthermore, as well known, the control coordinate axis is required when the three-phase voltage or the three-phase current is coordinate-transformed to the rotational orthogonal two axes, and the phase of the control coordinate axis as the rotational two-axes coordinate is set to θ on the basis of the arbitrary angular frequency ω. This phase θ is obtained from the formula (15) by integrating the angular frequency ω in the synchronous machine 16.

$$\theta = \int \omega \cdot dt \qquad (15)$$

The three-phase voltage instructions Vu*, Vv* and Vw* are calculated by using the d-axis voltage instruction Vd*, the q-axis voltage instruction Vq* and the phase θ obtained from the formulas (14) and (15). The voltage phase θv of the voltage instruction advances slightly ahead of the phase θ described above. Therefore, the voltage phase θv of the voltage instruction is calculated from the following formula (16) in which the correction amount F_BEET as the output of the voltage correcting means 6 is added to the phase.

$$\theta v = \theta + \tan^{-1}\left(\frac{Vq^*}{Vd^*}\right) + F\_BEET \qquad (16)$$

According to the formula (17), the three-phase voltage instructions Vu*, Vv*, Vw* are calculated on the basis of the voltage phase θv obtained from the formula (9), the d-axis voltage instruction Vd* and the q-axis voltage instruction Vq*.

$$\begin{pmatrix} Vu^* \\ Vv^* \\ Vw^* \end{pmatrix} = \sqrt{(Vd^*)^2 + (Vq^*)^2} \begin{pmatrix} \cos(\theta v) \\ \cos\left(\theta v - \frac{2}{3}\pi\right) \\ \cos\left(\theta v + \frac{2}{3}\pi\right) \end{pmatrix} \qquad (17)$$

The second power converter 2 converts DC to AC on the basis of the three-phase voltage instructions Vu*, Vv*, Vw* obtained by the voltage control means 17 according to the formula (17).

According to the formula (16), the voltage phase θv of the voltage to be output from the second power converter 2 is corrected on the basis of the pulsating component obtained from the pulsation detecting means 5, and thus the motor current, torque pulsation at the output side of the second power converter 2 can be suppressed. When the pulsating component P_BEET obtained from the pulsation detecting means 5 which is synchronized with the motor current, torque pulsation at the output side of the second power converter 2 is positive, the correction amount F_BEET as the output of the voltage correcting means 6 operates in the negative direction, and the voltage phase θv is adjusted to decrease, so that the phases of the three-phase voltage instructions Vu*, Vv*, Vw* output from the voltage control means 7 are shortened.

Conversely, when the pulsating component P_BEET obtained from the pulsation detecting means 5 is negative, the correction amount F_BEET as the output of the voltage correcting means 6 operates in the positive direction, and the voltage phase θv is adjusted to increase, so that the phases of the three-phase voltage instructions Vu*, Vv*, Vw* output from the voltage control means 7 are lengthened. Accordingly, the control can be performed in accordance with the motor current, torque pulsation at the output side of the second power converter 2, and the motor current, torque pulsation at the output side of the second power converter 2 can be suppressed. This embodiment for correcting the phase of the voltage instruction can be implemented on the basis of each of the variable-voltage variable-frequency (VVVF) control and the constant-voltage variable-frequency (CVVF) control.

As described above, by executing the third embodiment, with respect to the effect of the pulsation associated with the conversion from AC to DC in the first power converter 1, the effect that the torque pulsation and the motor current pulsation, etc. can be suppressed by detecting the pulsating component contained in the effective power of the second power converter 2 and correcting the phase of the voltage output from the second power converter 2 can be likewise obtained in the synchronous machine 16.

Fourth Embodiment

Figure 11:
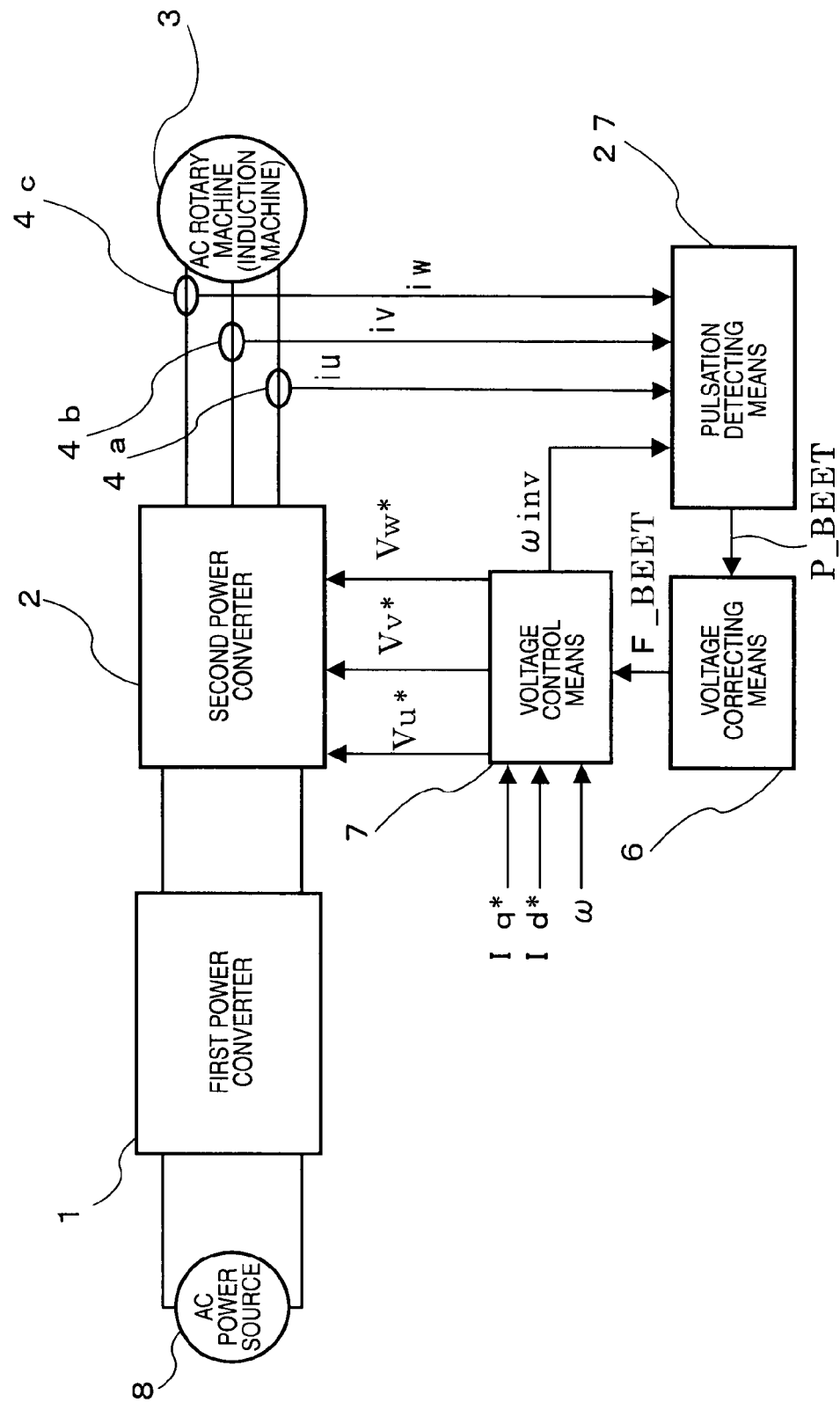
FIG. 11 is a diagram showing the construction of a power conversion system according to a fourth embodiment of the present invention.

Next, a power conversion system according to this embodiment will be described with reference to FIG. 11. This embodiment is different from the first embodiment in that pulsation detecting means 27 is provided with AC voltage calculating means 28. The other constructions are the same as the first embodiment, and thus they are represented by the same reference numerals in the figures.

Figure 12:
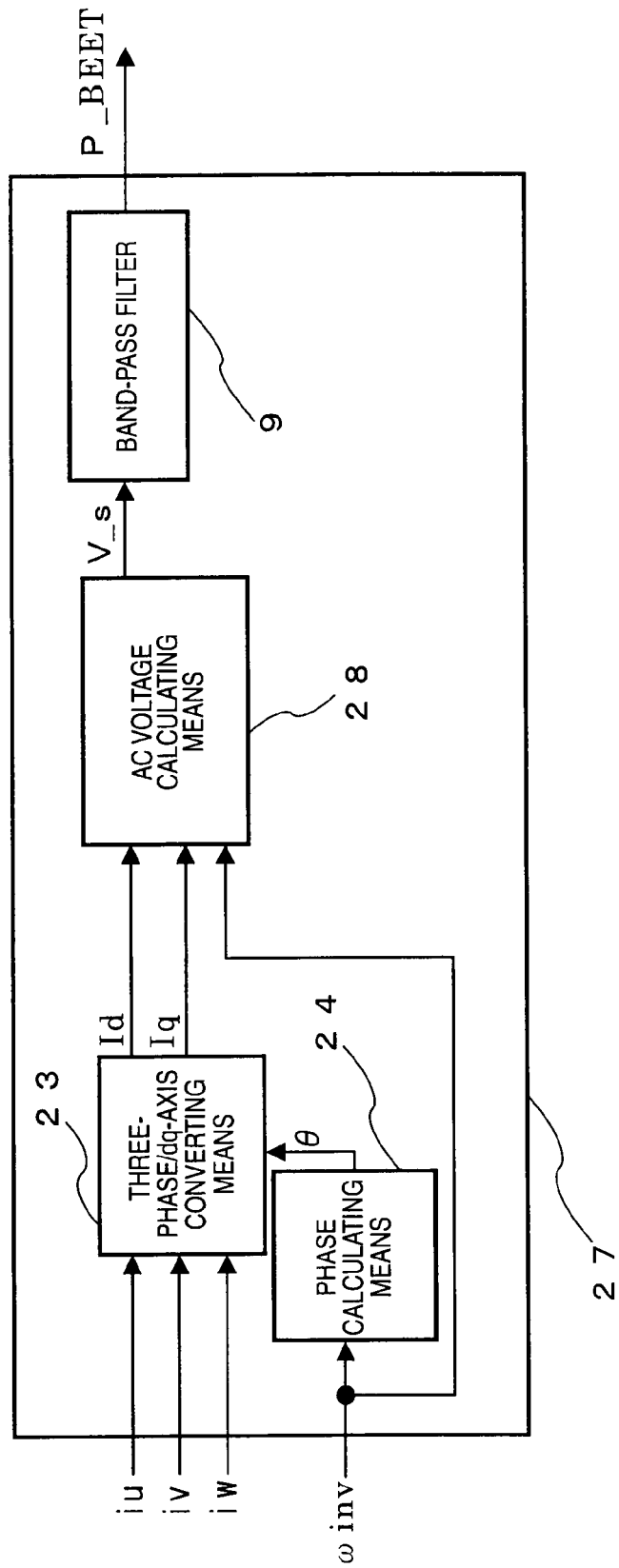
FIG. 12 is a diagram showing the detailed construction of pulsation detecting means according to the fourth embodiment of the present invention.

As shown in FIG. 12, the pulsation detecting means 27 has the three-phase/dq-axis converting means 23, the phase calculating means 24, the AC voltage calculating means 28 and the band-pass filter 9. The three-phase/dq-axis converting means 23, the phase calculating means 24 and the band-pass filter 9 are identical to those of the first embodiment.

The AC voltage calculating means 28 is supplied with the d-axis current Id and the q-axis current Iq output from the three-phase/dq-axis converting means 23 and the inverter angular frequency ωinv, and calculates the slip angular frequency from the d-axis current Id, the q-axis current Iq, and the secondary resistance value Rr and the secondary inductance value Lr of the induction machine according to the following formula (18).

$$\omega s = \frac{Iq}{Id} \times \frac{Rr}{Lr} \qquad (18)$$

The second power converter 2 calculates the inverter angular frequency ωinv corresponding to the frequency of the voltage instruction to be output by adding the slip angular frequency ωs with any inverter angular frequency ωinv. That is, the inverter angular frequency ωinv is calculated according to the formula (19).

$$\omega inv = \omega + \omega s \qquad (19)$$

A d-axis voltage Vd_s and a q-axis voltage Vq_s on the rotational two axes can be calculated from the inverter angular frequency ωinv, the toque current Iq and the magnetic flux current Id. That is, the d-axis voltage Vd_s and the q-axis voltage Vq_s are calculated according to the formulas (20) and (21).

$$Vd\_s = Rs \times Id - \omega inv \times \sigma \times Ls \times Iq \qquad (20)$$

$$Vq\_s = Rs \times Iq + \omega inv \times Ls \times Id \qquad (21)$$

With the d-axis voltage Vd_s and the q-axis voltage Vq_s calculated from the formulas (20) and (21), an AC voltage amplitude V_s is calculated according to the formula (22).

$$V\_s = \sqrt{(Vd\_s)^2 + (Vq\_s)^2} \qquad (22)$$

The AC voltage amplitude V_s calculated according to the formula (22) as the output of the pulsation detecting means 27 contains the pulsation of the motor current, the torque pulsating component which are caused by the pulsating component associated with the conversion from AC to DC in the first power converter 1.

The band-pass filter 9 of FIG. 12 extracts only the pulsating component associated with the conversion from AC to DC in the first power converter 1 which is contained in the AC voltage amplitude V_s as in the case of the first embodiment. The control method after the pulsating component P_BEET as the output of the band-pass filter 9 is obtained is the same as the first embodiment.

As described above, by executing the fourth embodiment, with respect to the effect of the pulsation association with the conversion from AC to DC in the first power converter 1, there can be obtained the effect that the torque pulsation, etc. are suppressed by detecting the pulsating component contained in the AC voltage of the second power converter 2 and correcting the frequency of the voltage output from the second power converter 2 as in the case of the first embodiment.

In the fourth embodiment, the AC voltage is calculated by the AC voltage calculating means 28 on the basis of the phase current iu, iv, iw flowing through the induction machine 3 at the AC side detected by the current detecting means 4a, 4b, 4c. In place of the current detecting means 4a, 4b, 4c, voltage detecting means which can detect an AC voltage may be used, and it is needless to say that the same effect is expected to be obtained insofar as means for detecting the quantity of electricity at the AC side is used.

Fifth Embodiment

Figure 13:
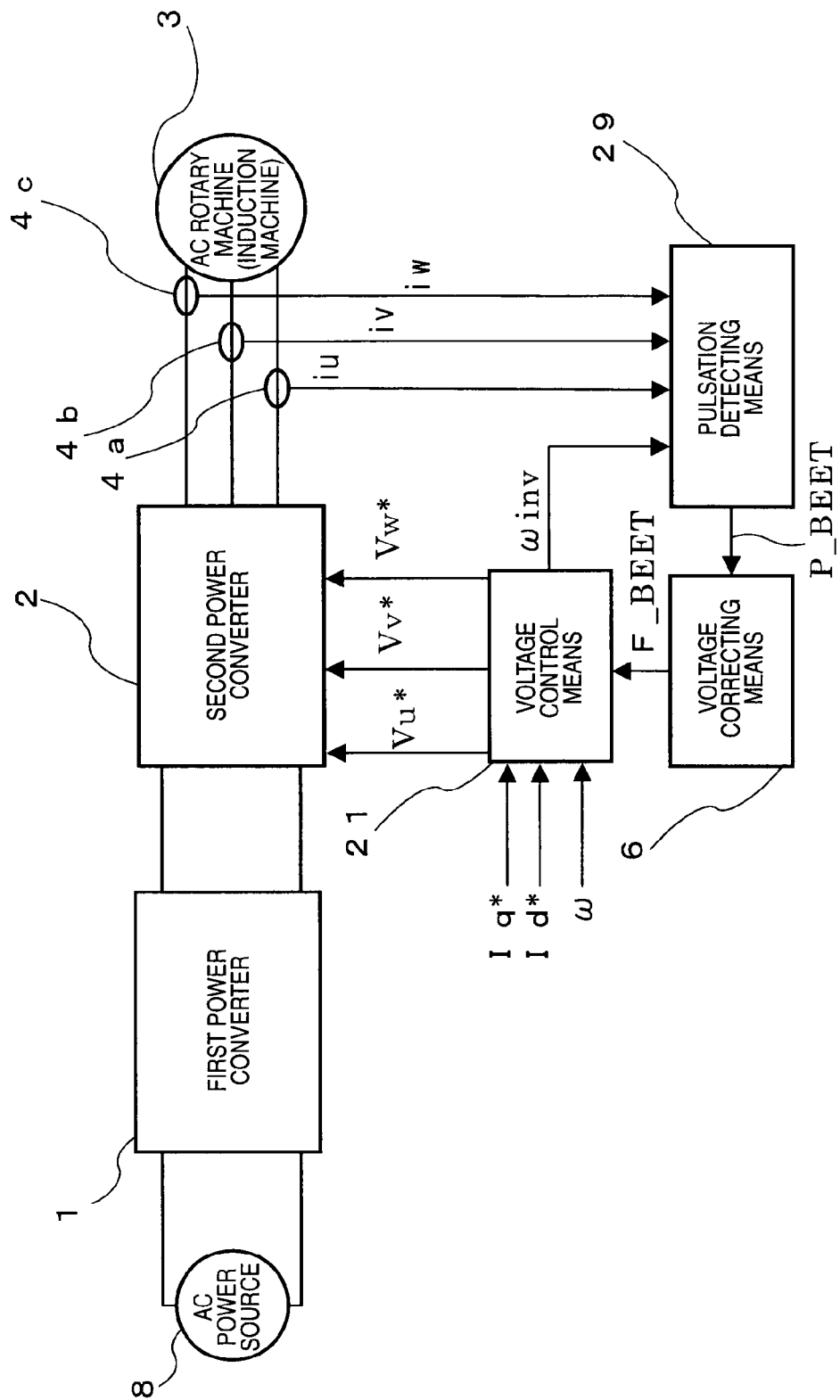
FIG. 13 is a diagram showing the construction of a power conversion system according to a fifth embodiment of the present invention.
Figure 14:
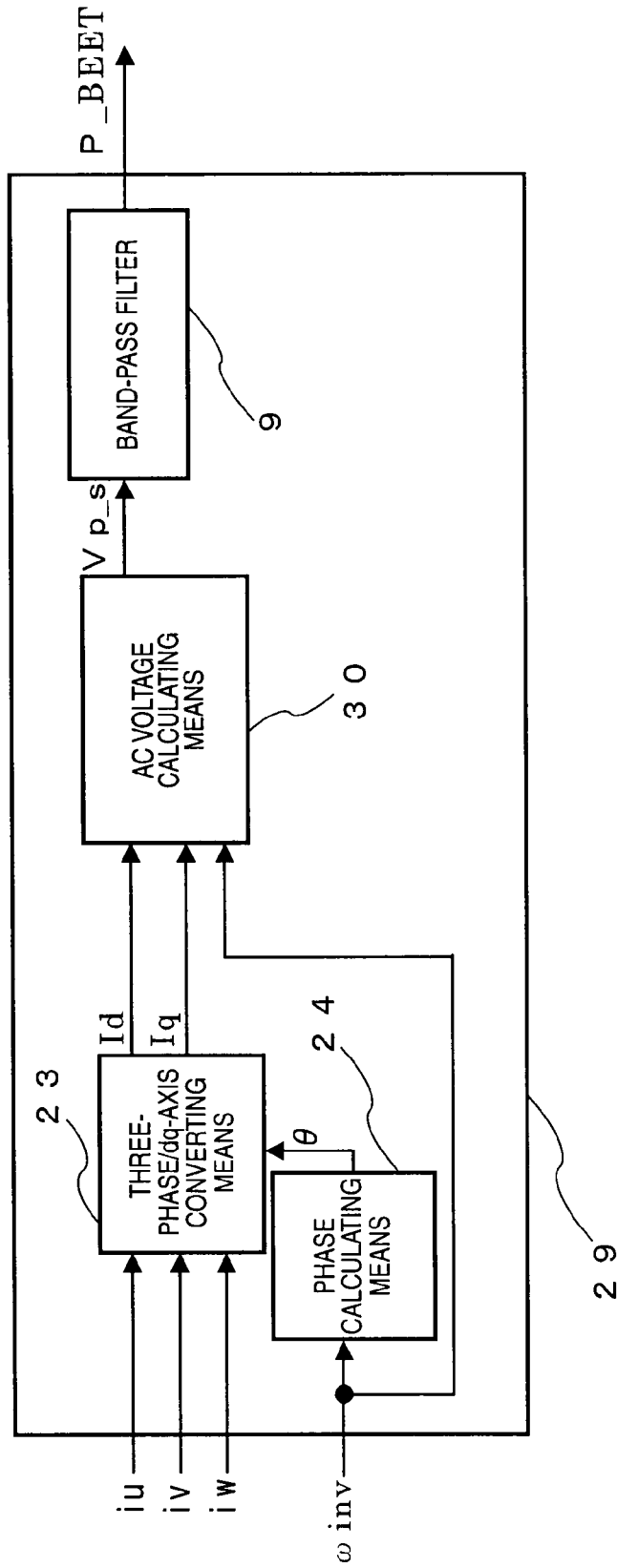
FIG. 14 is a diagram showing the detailed construction of pulsation detecting means according to the fifth embodiment of the present invention.

Next, a power conversion system according to a fifth embodiment will be described with reference to FIG. 13. This embodiment is different from the fourth embodiment in that pulsation detecting means 29 is provided with AC voltage calculating means 30. As shown in FIG. 14, the pulsation detecting means 29 has the three-phase/dq-axis converting means 23, the phase calculating means 24, the AC voltage calculating means 30 and the band-pass filter 9. The three-phase/dq-axis converting means 23, the phase calculating means 24 and the band-pass filter 9 are the same as the embodiment 2.

The AC voltage calculating means 30 receives the d-axis current Id, the q-axis current Iq and the inverter angular frequency ωinv being the outputs of the three-phase/dq-axis converting means 23 and calculates the slip angular frequency from the d-axis current Id, the q-axis current Iq, and the secondary resistance value Rr and the secondary inductance value Lr of the induction machine according to the following formula (18) as in the case of the fourth embodiment.

$$\omega s = \frac{Iq}{Id} \times \frac{Rr}{Lr} \qquad (18)$$

The inverter angular frequency ωinv corresponding to the frequency of the voltage instruction output from the second power converter 2 is calculated By adding the slip angular frequency ωs and any angular frequency ω. That is, the inverter angular frequency ωinv is calculated according to the formula (19) as in the case of the fourth embodiment.

$$\omega inv = \omega + \omega s \qquad (19)$$

The q-axis voltage Vq_s on the rotational two axes can be calculated from the inverter angular frequency ωinv, the torque current Iq and the magnetic flux current Id. That is, the q-axis voltage Vq_s is calculated according to the formula (21).

$$Vq\_s = Rs \times Iq + \omega inv \times Ls \times Id \qquad (21)$$

The q-axis voltage Vq_s calculated from the formula (21) contains the pulsation of the motor current, the torque pulsating component caused by the pulsating component associated with the conversion from AC to DC in the first power converter 1.

The band-pass filter 9 of FIG. 12 extracts only the pulsating component associated with the conversion from AC to DC in the first power converter 1 which is contained in the q-axis voltage Vq_s as in the case of the first embodiment. The pulsating component P_BEET as the output of the band-pass filter 9 is obtained, and the subsequent control method is the same as the second embodiment.

As described above, by executing the fifth embodiment, with respect to the effect of the pulsation associated with the conversion from AC to DC in the first power converter 1, there can be obtained the effect that the torque pulsation and the motor current pulsation, etc. are suppressed by detecting the pulsating component contained in the AC voltage of the second power converter 2 and correcting the amplitude of the voltage output from the second power converter 2 as in the case of the second embodiment.

Since the amplitude of the voltage instruction is corrected, this embodiment can be executed on the basis of only the variable-voltage variable-frequency (VVVF) control.

Sixth Embodiment

Figure 15:
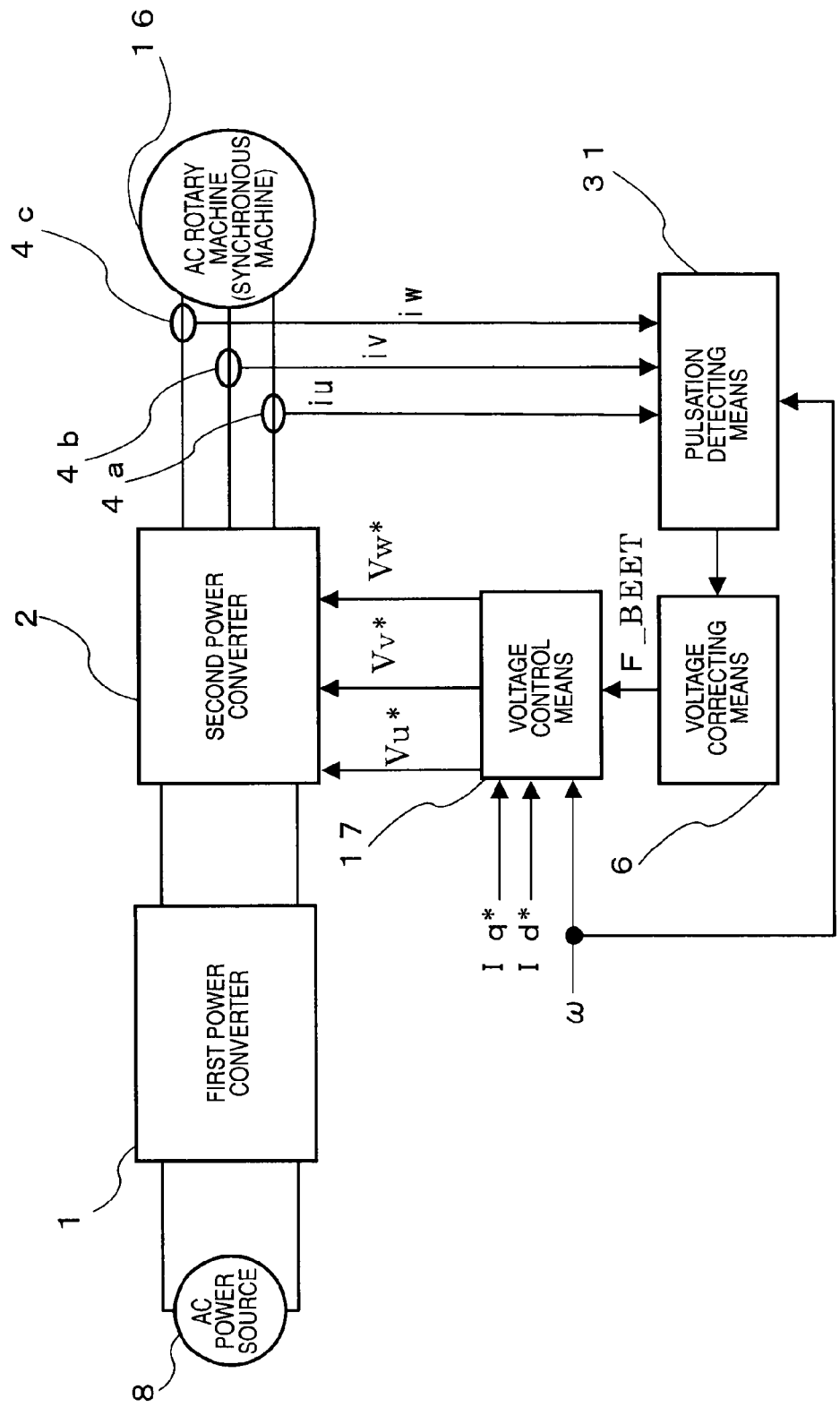
FIG. 15 is a diagram showing the construction of a power conversion system according to a sixth embodiment of the present invention.
Figure 16:
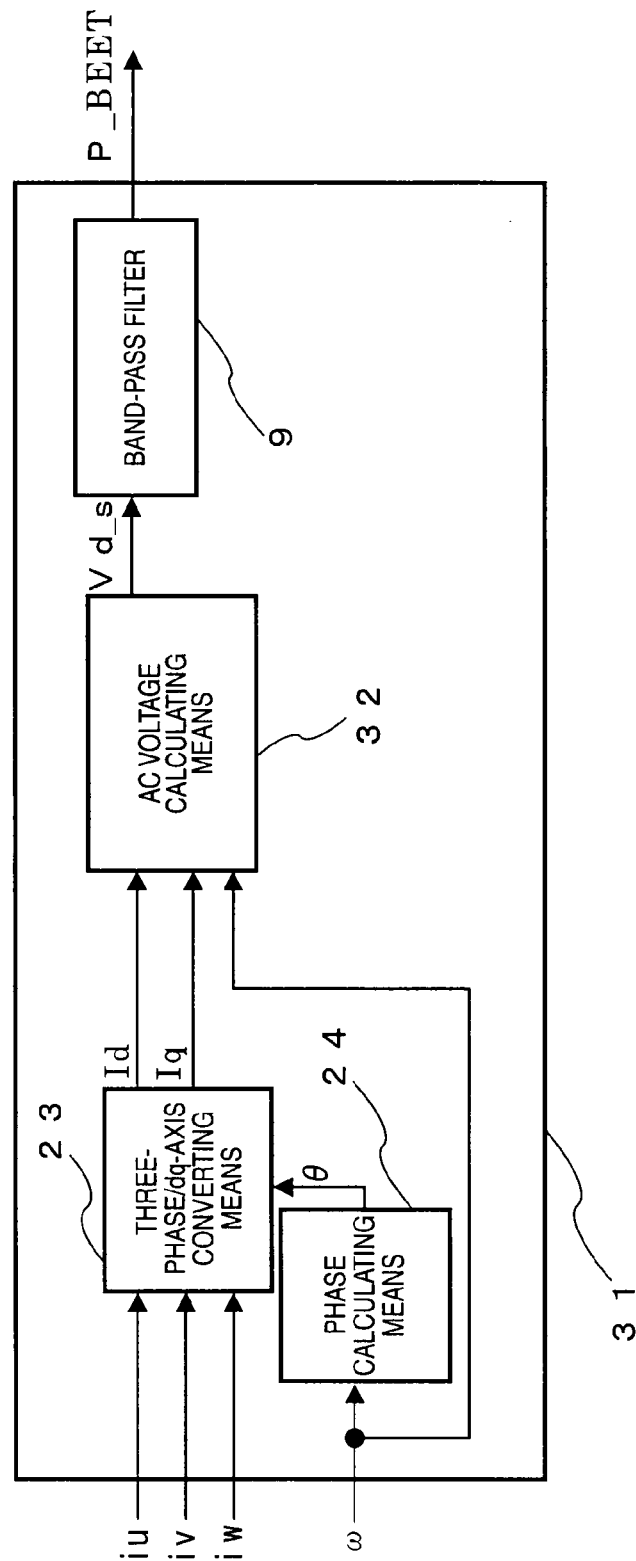
FIG. 16 is a diagram showing the detailed construction of pulsation detecting means according to the sixth embodiment of the present invention.

Next, a power conversion system according to this embodiment will be described with reference to FIG. 15. It is assumed that this embodiment is applied to the synchronous machine 16 as an AC rotary machine as in the case of the third embodiment, and this embodiment is different from the third embodiment in pulsation detecting means 31. This embodiment is different from the third embodiment in that the pulsation detecting means 31 detects the pulsating component from the d-axis AC voltage and corrects the phase of the voltage instruction in accordance with the pulsating component of the d-axis AC voltage. The other constructions are the same as the third embodiment, and they are represented by the same reference numerals. Only the different portions will be described hereunder.

The pulsation detecting means 31 of the sixth embodiment calculates the d-axis voltage Vd_s on the rotational two axes from any inverter angular frequency ωinv, the torque current Iq, the magnetic flux current Id, the d, q-axis inductance Ld, Lq, the interlinkage magnetic flux Φ based on permanent magnet and the differential operator p=d/dt by using the voltage equation of the synchronous machine 16. That is, the d-axis voltage Vd_s is calculated according to the formula (23).

$$Vd\_s = \left(R + \frac{d}{dt}Ld\right) \times Id - \omega \times Lq \times Iq \quad (23)$$

The d-axis voltage Vd_s calculated according to the above formula (23) contains the pulsation of the motor current, the torque pulsating component caused by the pulsating component associated with the conversion from AC to DC of the first power converter 1. In the formula (23), the item of the differential operator P=d/dt may be omitted to reduce the calculation amount, and d-axis voltage Vd_s can be calculated from the formula (24). The d-axis voltage Vd_s calculated according to the formula (24) contains the pulsation of the motor current, the torque pulsating component caused by the pulsating component associated with the conversion from AC to DC of the first power converter 1, and the pulsating component can be detected.

$$Vd\_s = R \times Id - \omega \times Lq \times Iq \quad (24)$$

In the formulas (23) and (24), the voltage phase θv of the voltage to be output from the second power converter is corrected in the voltage control means 17 on the basis of the pulsating component obtained from the pulsation detecting means 31, and thus the motor current, torque pulsation at the output side of the second power converter 2 can be suppressed.

When the pulsating component P_BEET obtained from the pulsation detecting means 31 which is synchronized with the motor current, torque pulsation at the output side of the second power converter 2 is positive, the correction amount F_BEET as the output of the voltage correcting means 6 operates in the negative direction, and the voltage phase θv is adjusted to decrease, so that the phases of the three-phase voltage instructions Vu*, Vv*, Vw* output from the voltage control means 17 are shortened.

Conversely, when the pulsating component P_BEET obtained from the pulsation detecting means 31 is negative, the correction amount F_BEET as the output of the voltage correcting means 6 operates in the positive direction, and the voltage phase θv is adjusted to increase, so that the phases of the three-phase voltage instructions Vu*, Vv*, Vw* output from the voltage control means 17 are lengthened. Accordingly, the control can be performed in accordance with the motor current, torque pulsation at the output side of the second power converter 2, and the motor current, torque pulsation at the output side of the second power converter 2 can be suppressed.

This embodiment for correcting the phase of the voltage instruction can be executed on the basis of each of the variable-voltage variable-frequency (VVVF) control and the constant-voltage variable-frequency (CVVF) control.

As described above, by executing the sixth embodiment, with respect to the effect of the pulsation associated with the conversion from AC to DC in the first power converter 1, there can be likewise obtained in the synchronous machine 16 the effect that the torque pulsation and the motor current pulsation, etc. are suppressed by detecting the pulsating component contained in the AC voltage of the second power converter 2 and correcting the phase of the voltage output from the second power converter 2.

Seventh Embodiment

Figure 17:
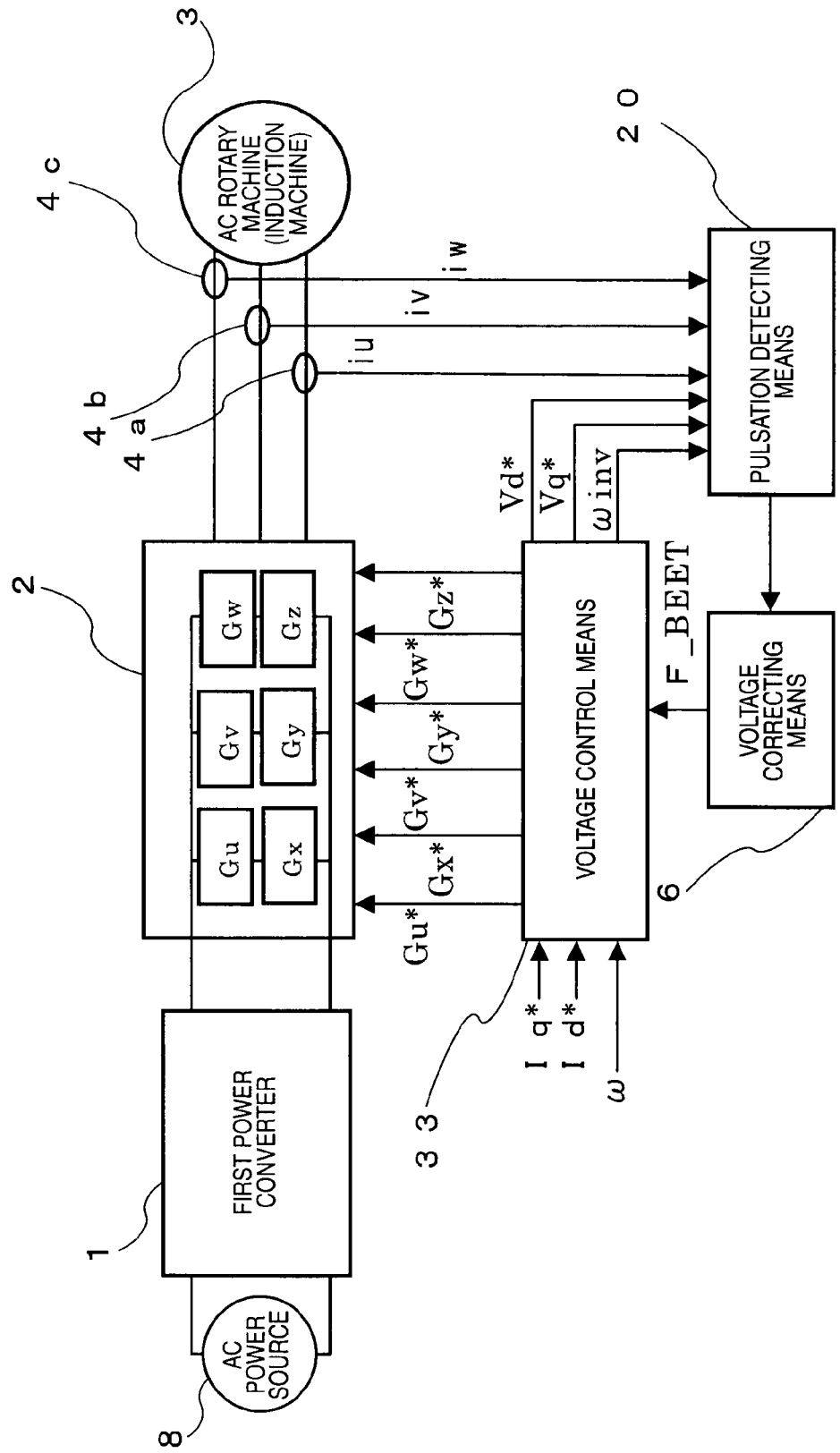
FIG. 17 is a diagram showing the construction of a power conversion system according to a seventh embodiment of the present invention.

Next, a power conversion system according to this embodiment will be described with reference to FIG. 17. This embodiment is different from the second embodiment in voltage control means 33, and it is characterized in that a pulsating component is detected on the basis of AC power as in the case of the second embodiment and the pulse position is corrected in accordance with the pulsating component by the voltage control means 33. The other constructions are the same as the second embodiment, and they are represented by the same reference numerals in the figures. Only the different portion will be described hereunder.

Figure 18:
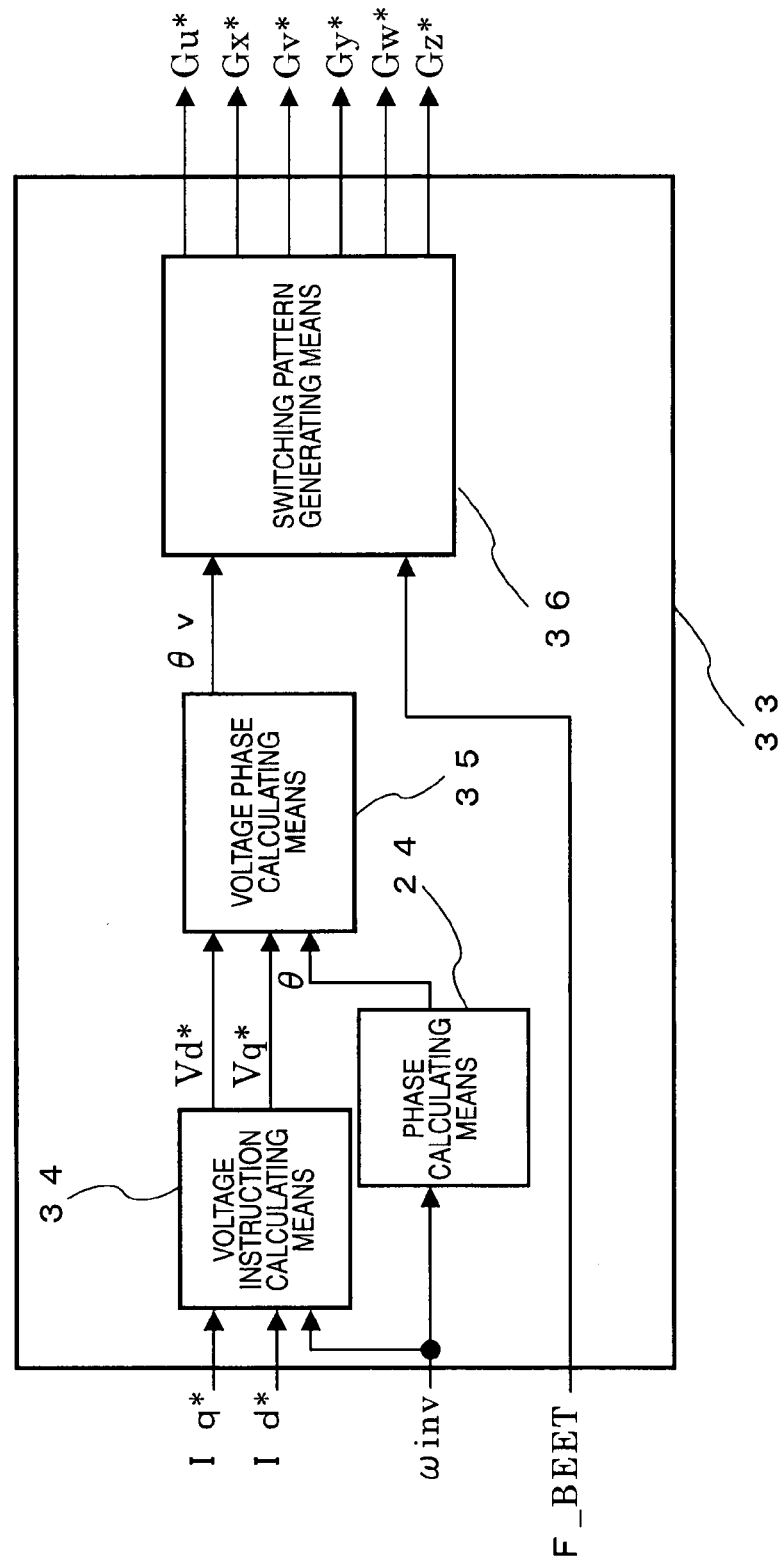
FIG. 18 is a diagram showing the construction of voltage control means according to the seventh embodiment of the present invention.

The voltage control means 33 outputs a switching signal of a switching element to be output from the second power converter 2 on the basis of the torque current instruction Iq*, the magnetic flux current instruction Id* and any angular frequency ω. FIG. 18 is a diagram showing the detailed construction of the voltage control means 33, and it comprises voltage instructing means 34, voltage phase calculating means 35 and switching pattern generating means 36 in addition to the phase calculating means 24. In the voltage instruction calculating means 34, a slip angular frequency instruction ωs* is calculated by using the motor constants of the induction machine Rs: the primary resistance value of the motor, Ls: the primary inductance of the motor, σ=1−M²/Ls/Lr, M: the mutual inductance of the motor, Lr: the secondary inductance of the motor and Rr: the secondary resistance value of the motor from the torque current instruction Iq* and the magnetic flux current instruction Id*. That is, the slip angular frequency instruction ωs* is calculated according to the formula (5).

$$\omega s^* = \frac{Iq^*}{Id^*} \times \frac{Rr}{Lr} \quad (5)$$

By adding the slip angular frequency instruction ωs* and any inverter angular frequency ωinv, the second power converter 2 calculates the inverter angular frequency ωinv corresponding to the frequency of the voltage instruction to be output. That is, the inverter angular frequency ωinv is calculated according to the formula (12)

$$\omega inv = \omega + \omega s^* \quad (12)$$

The d-axis voltage instruction Vd* and the q-axis voltage instruction Vq* on the rotational two axes can be calculated from the inverter angular frequency ωinv, the torque current instruction Iq* and the magnetic flux current instruction Id*. That is, the d-axis voltage instruction Vd* and the q-axis voltage instruction Vq* are calculated according to the formulas (7).

$$Vd^* = Rs \times Id^* - \omega inv \times \sigma \times Ls \times Iq^*$$

$$Vq^* = Rs \times Iq^* + \omega inv \times Ls \times Id^* \quad (7)$$

As described above, the control coordinate axis is required when the phase calculating means 24 coordinate-transforms the three-phase voltage or the three-phase current to the rotational orthogonal two axes, and the phase of the control coordinate axis as the rotational two-axes coordinate is set to θ on the basis of any inverter angular frequency ωinv. This phase θ is obtained by integrating the inverter angular frequency ωinv according to the formula (8).

$$\theta = \int \omega inv \cdot dt \quad (8)$$

The voltage phase θv of the voltage instruction by the voltage phase calculating means 35 advances slightly ahead of the phase θ, and thus it is calculated according to the following formula (9).

$$\theta v = \theta + \tan^{-1}\left(\frac{Vq^*}{Vd^*}\right) \quad (9)$$

In the constant-voltage variable-frequency (CVVF) control, the value of the square root of the value obtained by adding the square of the d-axis voltage instruction Vd* and the square of the q-axis voltage instruction Vq* is the maximum value of the DC voltage, and thus the switching pattern of the second power converter 2 in the constant-voltage variable-frequency (CVVF) control is determined from the voltage phase θv obtained according to the formula (9). For example, when the second power converter 2 is constructed by a 2-level inverter device, a switching element at the plus side (upper side) of the U-phase is represented by Gu, a switching signal for switching the switching element Gu is represented by Gu*, a switching element at a minus side (lower side) of the U-phase is likewise represented by Gx and a switching signal for switching the switching element Gx is represented by Gx*.

Likewise, a switching element at the plus side (upper side) of the V-phase is represented by Gv, a switching signal for switching the switching element Gv is represented by Gv*, a switching element at the minus (lower) side of the V-phase is represented by Gy, and a switching signal for switching the switching element Gy is represented by Gy*. Furthermore, a switching element at the plus (upper) side of the W-phase is represented by Gw, a switching signal for switching the switching element Gw is represented by Gw*, a switching element at the minus (lower) side of the W-phase is represented by Gz, and a switching signal for switching the switching element Gz is represented by Gz*. The voltage phase θv of the voltage instruction obtained from the voltage phase calculating means 35 and the correction amount F_BEET obtained from the voltage correcting means 6 are input to the switching pattern generating means 36, and the switching signals Gu*, Gx*, Gv*, Gy*, Gw*, Gz* of the switching elements Gu, Gx, Gv, Gy, Gw, Gz constituting the second power converter 2 are calculated in the switching pattern generating means 36.

Figure 19:
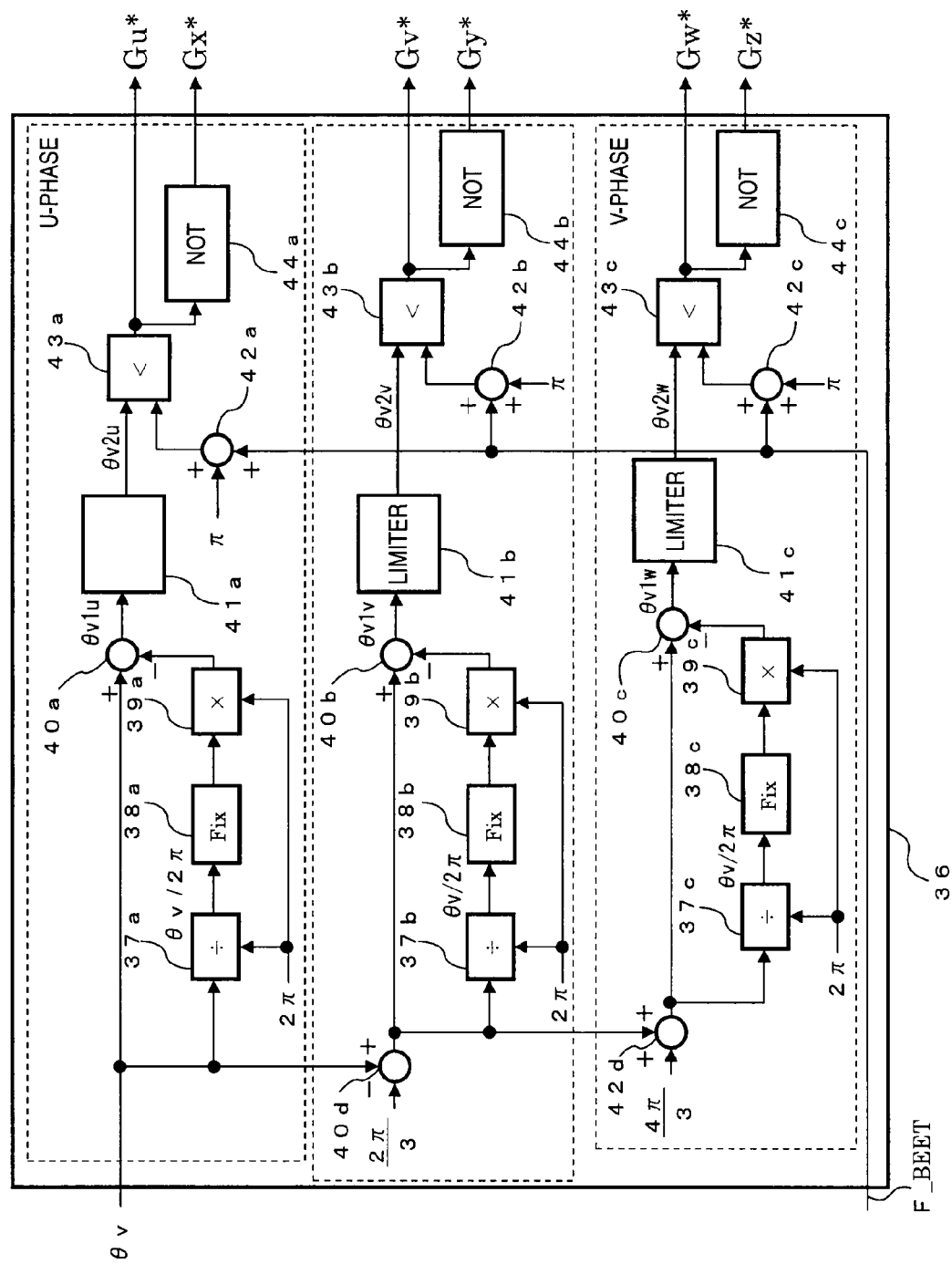
FIG. 19 is a diagram showing the detailed construction of switching pattern generating means according to the seventh embodiment of the present invention.

An example of the specific construction of the switching pattern generating means 36 is shown in FIG. 19. The operation of the switching pattern generating means 36 will be described with reference to FIG. 19. The voltage phase θv of the voltage instruction obtained by the voltage phase calculating means 35 is divided by 2π in a divider 37*a*. The division value (θv/2π) is subjected to an integer-extracting function 38*a* for extracting an integer portion of the division value. The integer value of (θv/2π) is multiplied by 2π in a multiplier 39*a*, and the multiplication value is subtracted from θv in a subtracter 40*a*. Through the above processing, θv is set to θv1u which is a value between 0 [rad/sec] and 2π [rad/sec]. Limiter means 41*a* is provided by way of precaution so that θv1u is not beyond the range between 0 [rad/sec] and 2π [rad/sec], and executes the processing of the following formula (25).

$$\left.\begin{array}{l} 0 \leq \theta v1u \leq 2\pi \to \text{output } \theta v2u \text{ of limiter } 41a = \theta v1u \\ 0 > \theta v1u \to \text{output } \theta v2u \text{ of limiter } 41a = 0 \\ \theta v1u > 2\pi \to \text{output } \theta v2u \text{ of limiter } 41a = 2\pi \end{array}\right\} \quad (25)$$

θv2u obtained by the limiter means 41*a* is input to a comparator 43*a*, and θv2u is compared with the sum of π and the correction amount F_BEET obtained by the voltage correcting means 6. That is, the processing of the following formula (26) is executed in the comparator 43*a*. Furthermore, an inverting (NOT) logic unit 44*a* outputs a value opposite to the output value of the comparator 42*a* (when the output value of the comparator 42 is equal to 1, the output value of the inverting (NOT) logic unit 44*a* is equal to 0). The output value of the inverting (NOT) logic unit 44*a* is also contained in the formula (26). The output value of the comparator 42*a* is represented as the switching signal Gu*, and the output value of the inverting logic unit 44*a* is represented as the switching signal Gx*.

$$\left.\begin{array}{l} \theta v2u \leq \pi + F\_BEET \to \text{output value } Gu^* \\ \quad \text{of comparator } 42a = 1 \quad (\text{ON state}) \\ \theta v2u > \pi + F\_BEET \to \text{output value } Gu^* \\ \quad \text{of comparator } 42a = 0 \quad (\text{OFF state}) \\ \theta v2u \leq \pi + F\_BEET \to \text{output value } Gx^* \\ \quad \text{of inverting logic unit } 44a = 0 \quad (\text{OFF state}) \\ \theta v2u > \pi + F\_BEET \to \text{output value } Gx^* \\ \quad \text{of inverting logic unit } 44a = 1 \quad (\text{ON state}) \end{array}\right\} \quad (26)$$

From the formula (26), the correction amount F_BEET obtained from the voltage correcting means 6 is added to a switching timing for determining the ON/OFF timing of the switching signals Gu*, Gx* to be corrected. Therefore, the timing of the switching signal to be output from the second power converter 2 is corrected on the basis of the pulsating component obtained from the pulsation detecting means 20. That is, the pulse position to be output by the second power converter 2 is corrected on the basis of the pulsating component obtained from the pulsation detecting means 20.

The foregoing is the operation for determining the timing of the switching signals Gu*, Gx* of the U-phase. Likewise, the timing of the switching signals Gv*, Gy*, Gw*, Gz* of the V-phase and the W-phase which are displaced from the U-phase by 2π/3 (120°) are determined. Furthermore, as in the case of the U-phase, the correction amount F_BEET obtained from the voltage correcting means 6 is added to the switching timing for determining the ON/OFF timing of the switching signal to be corrected. Therefore, the timing of the switching signal to be output from the second power converter 2 is corrected on the basis of the pulsating component obtained from the pulsation detecting means 20. That is, the pulse position to be output by the second power converter 2 is corrected on the basis of the pulsating component obtained from the pulsation detecting means 20.

That is, from the formula (26) the pulse width to be output from the second power converter 2 is corrected on the basis of the pulsating component obtained from the pulsation detecting means 20, and thus the motor current, torque pulsation at the output side of the second power converter 2 can be suppressed. Specifically, when the pulsating component P_BEET obtained from the pulsation detecting means 20 which is synchronized with the motor current, torque pulsation at the output side of the second power converter 2 is positive, the correction amount F_BEET as the output of the voltage correcting means 6 operates in the negative direction, and the pulse width of the ON state of the switching signal Gu* is adjusted to be small, so that the pulse widths of the switching signals Gu*, Gv*, Gw* output from the voltage control means 33 are shortened.

Conversely, when the pulsating component P_BEET obtained from the pulsation detecting means 20 is negative, the correction amount F_BEET as the output of the voltage correcting means 6 operates in the positive direction, and the pulse width of the ON state of the switching signal Gu* is adjusted to be large, so that the pulse widths of the switching signals Gu*, Gv*, Gw* output from the voltage control means 33 are large. Therefore, the control can be performed in accordance with the motor current, torque pulsation at the output side of the second power converter 2, and the motor current, torque pulsation at the output side of the second power converter 2 can be suppressed.

As described above, by executing the seventh embodiment, with respect to the effect of the pulsation associated with the conversion from AC to DC in the first power converter 1, there can be obtained the effect that the torque pulsation, etc. are suppressed by detecting the pulsating component contained in the effective power of the second power converter 2 and correcting the frequency of the voltage output from the second power converter 2.

Eighth Embodiment

Next, a power conversion system according to an eighth embodiment will be described with reference to FIG. 20. In this embodiment, as in the case of the fourth embodiment, the pulsation detecting means 27 detects from AC voltage and the same voltage control means 33 as the seventh embodiment is combined. The same effect as the seventh embodiment can be expected.

That is, this embodiment is characterized in that the pulsating component is detected from the AC voltage as in the case of the fourth embodiment, and the pulse position is corrected in accordance with the detected pulsating component by the voltage control means 33. The other constructions are the same as the fourth and seventh embodiments, and they are represented by the same reference numerals in the figures.

This embodiment can be implemented on the basis of each of the variable-voltage variable-frequency (VVVF) control and the constant-voltage variable-frequency (CVVF) control.

As described above, by executing the eighth embodiment, with respect to the effect of the pulsation associated with the conversion from AC to DC in the first power converter 1, there can be obtained the effect that the torque pulsation and the motor current pulsation, etc. are suppressed by detecting the pulsating component contained in the effective power of the second power converter 2 and correcting the frequency of the voltage output from the second power converter 2.

In the above first and second embodiments, the effective power calculating means 10, 22 are used as the pulsation detecting means 5, 20. It is needless to say that the pulsating component can be also detected from a pulsating component contained in another quantity of electricity containing a frequency band containing the rectification ripple frequency by the first power converter 1, for example, power or apparent power.

Furthermore, in the first to eighth embodiments described above, only one of the frequency, amplitude, phase and pulse width of the voltage instruction is corrected by detecting the pulsating component. However, it is needless to say that the means for correcting the voltage instruction can obtain the same effect by correcting both the frequency of the voltage instruction and the amplitude of the voltage instruction. Therefore, it is expectable that the method of correcting the voltage instruction executed in the first to eighth embodiments has the same effect by combining any two or more of the frequency, amplitude, phase and pulse width of the voltage instruction.

Industrial Applicability

This invention relates to an inverter for driving an AC motor at a variable speed by using as a power source DC which is rectified from an AC power source by a converter, and particularly it is necessarily applicable to an electric train as an alternating rail type railway having a single-phase AC power source in which rectification pulsation is increased, and also applicable to a ventilation inverter device for an electric train, and equipment which is a single-phase electricity reception type home electric appliance and controls a motor with an inverter, for example, an air conditioner, a refrigerator, a cloth washer or the like.

The invention claimed is:

1. A power conversion system comprising:
a first power converter for converting AC to DC;
a second power converter for converting the DC converted by the first power converter to AC having any frequency;
a current detecting means for detecting a current of the second power converter;
pulsation detecting means including effective power calculating means for calculating effective power based on an output of a voltage control means controlling the second power converter and based on the current detected by the current detecting means, the pulsation detecting means also including means for band-pass filtering the effective power to detect a rectification ripple frequency of the first power converter;
voltage correcting means for outputting a correction amount of a voltage to be output to the second power converter on the basis of the rectification ripple frequency obtained from the pulsation detecting means; and
the voltage control means for outputting a voltage instruction to be output to the second power converter on the basis of the correction amount obtained from the voltage correcting means.

2. The power conversion system according to claim 1, wherein the effective power calculating means calculates the effective power from a three-phase voltage instruction output from the voltage control means and three-phase current detected by the current detecting means.

3. The power conversion system according to claim 1, wherein the effective power calculating means calculates the effective power from an AC voltage instruction calculated by the voltage control means and dq current calculated by three-phase/dq-axis conversion calculating means.

4. The power conversion system according to claim 1, wherein the pulsation detecting means detects a frequency band containing a rectification ripple frequency by the first power converter from a pulsating component contained in the AC voltage of the second power converter.

5. A power conversion system comprising:
a first power converter for converting AC to DC;
a second power converter for converting the DC converted by the first power converter to AC having any frequency;
a current detector configured to detect a current of the second power converter;

a pulsation detector including an effective power calculator configured to calculate effective power based on an output of a voltage controller controlling the second power converter and based on the current detected by the current detector, the pulsation detector also including a band-pass filter to filter the effective power to detect a rectification ripple frequency of the first power converter;

a voltage corrector configured to output a correction amount of a voltage to be output to the second power converter on the basis of the rectification ripple frequency obtained from the pulsation detector; and the voltage controller configured to output a voltage instruction to be output to the second power converter on the basis of the correction amount obtained from the voltage corrector.

6. The power conversion system according to claim 5, wherein the effective power calculator is configured to calculate the effective power from a three-phase voltage instruction output from the voltage controller and three-phase current detected by the current detector.

7. The power conversion system according to claim 5, wherein the effective power calculator is configured to calculate the effective power from an AC voltage instruction calculated by the voltage controller and dq current calculated by a three-phase/dq-axis conversion calculator.

8. The power conversion system according to claim 5, wherein the pulsation detector detects a frequency band containing a rectification ripple frequency by the first power converter from a pulsating component contained in the AC voltage of the second power converter.

* * * * *